United States Patent
Jain et al.

(10) Patent No.: US 6,463,444 B1
(45) Date of Patent: Oct. 8, 2002

(54) VIDEO CATALOGER SYSTEM WITH EXTENSIBILITY

(75) Inventors: Ramesh Jain, San Diego; Charles Fuller, Foster City; Mojgan Monika Gorkani, San Francisco; Bradley Horowitz, San Mateo; Richard D. Humphrey, Foster City; Michael J. Portuesi, San Francisco; Chiao-fe Shu, San Mateo, all of CA (US); Arun Hampapur, White Plains, NY (US); Amarnath Gupta, San Diego, CA (US); Jeffrey Bach, Aurora, IL (US)

(73) Assignee: Virage, Inc., San Mateo, CA (US)

( * ) Notice: Subject to any disclaimer, the term of this patent is extended or adjusted under 35 U.S.C. 154(b) by 0 days.

(21) Appl. No.: 09/134,498

(22) Filed: Aug. 14, 1998

Related U.S. Application Data

(60) Provisional application No. 60/055,751, filed on Aug. 14, 1997.

(51) Int. Cl.$^7$ ............................................. G06F 17/00
(52) U.S. Cl. ................................. 707/104.1; 345/723
(58) Field of Search ............................. 707/102, 103, 707/104.1; 709/328; 345/326, 700, 716, 722, 723

(56) References Cited

U.S. PATENT DOCUMENTS

| 5,045,940 A | 9/1991 | Peters et al. ................. 348/472 |
| 5,136,655 A | 8/1992 | Bronson ....................... 381/41 |
| 5,307,456 A | 4/1994 | MacKay ...................... 345/328 |
| 5,467,288 A | 11/1995 | Fasciano et al. ............. 364/514 |
| 5,481,296 A | 1/1996 | Cragun et al. ................. 348/13 |
| 5,485,553 A | 1/1996 | Kovalick et al. ............. 358/1.6 |
| 5,508,940 A | 4/1996 | Rossmere et al. ........... 345/328 |
| 5,521,841 A | 5/1996 | Arman et al. .............. 364/514 |
| 5,561,457 A | 10/1996 | Cragun et al. ................. 348/13 |

(List continued on next page.)

FOREIGN PATENT DOCUMENTS

| WO | WO 96/12239 | 4/1996 |
| WO | WO 97/26758 | 7/1997 |

OTHER PUBLICATIONS

Film and Television Update, Avid Technology, Inc., vol. 1, No. 1., Jul. 1997.
Broadcast Update, Avid Technology, Inc., vol. 1, No. 1., Oct. 1996.
Avid Answers, Avid Technology, Inc., vol. 3, No. 1., Jan./Feb. 1996.

(List continued on next page.)

*Primary Examiner*—Jack Choules
(74) *Attorney, Agent, or Firm*—Knobbe, Martens, Olson & Bear, LLP

(57) ABSTRACT

One aspect of the invention is directed to a system and method for video cataloging. The video is cataloged according to predefined or user definable metadata. The metadata is used to index and then retrieve encoded video. Video feature extractors produce metadata tracks from the video information, and each metadata track indexes the stored video information. A feature extractor registration interface registers the video feature extractors, providing for registration with the video engine of new video feature extractors with new metadata tracks.

20 Claims, 18 Drawing Sheets

U.S. PATENT DOCUMENTS

| | | | |
|---|---|---|---|
| 5,566,290 A | 10/1996 | Silverbrook | 345/473 |
| 5,574,845 A | 11/1996 | Benson et al. | 395/118 |
| 5,606,655 A | 2/1997 | Arman et al. | 395/140 |
| 5,613,032 A | 3/1997 | Cruz et al. | 386/69 |
| 5,649,060 A | 7/1997 | Ellozy et al. | 395/2.87 |
| 5,664,218 A | 9/1997 | Kim et al. | 345/519 |
| 5,664,227 A | 9/1997 | Mauldin et al. | 395/778 |
| 5,680,639 A | 10/1997 | Milne et al. | 345/302 |
| 5,701,153 A | 12/1997 | Reichek et al. | 348/14.1 |
| 5,706,290 A | 1/1998 | Shaw et al. | 370/465 |
| 5,740,388 A | 4/1998 | Hunt | 345/328 |
| 5,745,637 A | 4/1998 | Phillips et al. | 386/46 |
| 5,751,280 A | 5/1998 | Abbott et al. | 345/302 |
| 5,777,612 A | 7/1998 | Kataoka | 345/302 |
| 5,794,249 A | 8/1998 | Orsolini et al. | 707/104 |
| 5,809,512 A | 9/1998 | Kato | 207/502 |
| 5,813,014 A * | 9/1998 | Gustman | 707/103 |
| 5,818,512 A | 10/1998 | Fuller | 725/82 |
| 5,822,024 A | 10/1998 | Setogawa et al. | 348/425.1 |
| 5,835,667 A | 11/1998 | Wactlar et al. | |
| 5,852,435 A | 12/1998 | Vigneaux et al. | 345/302 |
| 5,872,565 A | 2/1999 | Greaves et al. | 345/328 |
| 5,890,175 A | 3/1999 | Wong et al. | 707/505 |
| 5,893,095 A | 4/1999 | Jain et al. | 707/6 |
| 5,898,441 A | 4/1999 | Flurry | 345/507 |
| 5,903,261 A | 5/1999 | Walsh et al. | 345/302 |
| 5,903,892 A | 5/1999 | Hoffert et al. | 707/10 |
| 5,920,856 A | 7/1999 | Syeda-Mahmood | 707/3 |
| 5,926,205 A | 7/1999 | Krause et al. | 725/103 |
| 5,930,446 A | 7/1999 | Kanda | 386/52 |
| 5,946,445 A | 8/1999 | Peters et al. | 386/52 |
| 5,953,005 A | 9/1999 | Liu | 345/302 |
| 5,963,702 A | 10/1999 | Yamashita | 386/46 |
| 5,969,716 A | 10/1999 | Davis et al. | 345/328 |
| 5,982,979 A | 11/1999 | Omata et al. | 386/69 |
| 5,987,454 A * | 11/1999 | Hobbs | 707/4 |
| 5,990,955 A | 11/1999 | Koz | 375/240.01 |
| 6,006,241 A | 12/1999 | Purnaveja et al. | 707/512 |
| 6,009,507 A | 12/1999 | Brooks et al. | 712/28 |
| 6,014,183 A | 1/2000 | Hoang | |
| 6,034,942 A | 3/2000 | Yoshio et al. | 369/278.3 |
| 6,094,671 A * | 7/2000 | Chase et al. | 709/201 |
| 6,167,404 A * | 12/2000 | Morcos et al. | 707/102 |

OTHER PUBLICATIONS

Avid Answers, Avid Technology, Inc., vol. 2, No. 6., Nov./Dec. 1995.

Smith, Aguirre T., Multimedia—For Now & the Future, Summer Proceedings, USENIX Technical Conference and Exhibition (1991), pp. 157–168 "Parsing Movies in Context".

Smith, Aguire T., MIT MS Thesis (1992) "If You Could See What I Mean . . . ".

Smith, Aguirre T., Davenport, G., ACM Workshop on Networking and Operating System Support for Digital Audio and Video (1992), San Diego, California, pp. 250–261, "The Stratification System : A Design Environment for Random Access Video".

Arman, Farshid Hsu, Arding and Chiu, Ming–Yee, SPIE vol. 1908, pp. 2–12, (1993) "Feature Management for Large Video Databases".

Arman, F., Depommier, R., Hsu, Arding and Chiu, Ming–Yee, ACM Multimedia, pp. 97–103 (1994) "Content-–Based Browsing of Video Sequences".

Smith, Michael A. and Kanade, Takeo, CMU–CS–95–186, Jul. 30, 1995, Pittsburgh Pennsylvania "Video Skimming For Quick Browsing Based on Audio and Image Characterization".

Rowley, Henry A., Baluja, Shumeet and Kanade, Takeo, CMU–CS–95–158R, Nov. 1995, Pittsburgh, Pennsylvania "Human Face Detection in Visual Scenes".

Hampapur, Arun, Gupta, Amarnath, Horowitz, Bradley, Shu, Chiao–Fe, et al., Virage Inc. , Mar. 1997, San Mateo, California "Virage Video Engine".

Virage, Inc., "The Virage Media Management System", (1997), San Mateo, California (Brochure).

Visionary, Media Access Technologies, Ltd., (1998) (Brochure) "Automated Logging and Search Solution for Multimedia Streams and Libraries".

Virage, Inc., The Virage Media Manager & Browser 1.1, (1998), San Mateo, California (Brochure) "Place Your Media Assets Within Reach Of Your Entire Enterprise".

Virage, Inc., The Virage Video Cataloger 1.1, (1998), San Mateo, California (Brochure) "Discover a Highly Efficient Approach to Video Cataloging".

Excalibur Technologies, (1998),. Vienna Virginia (Brochure) "Excalibur Screening Room™: The Intelligent Way to Reveal and Leverage Video Content".

Sherman, Howard, Howard Sherman Public Relations News, Apr. 9, 1998 (News Release) "Ingenious Realtime Video Archival & Retrieval Solution".

The Content Group, Content Watch, vol. 1 No. 5. pp. 6–7, 23, (1998) "Excalibur Enters the Video Market With the Release Of Excalibur Screening Room".

The Content Group, Content Watch, vol. 1 No. 5. pp. 20–22, (1998) "Islip Media Delivers Advanced Tools for Video Indexing and Retrieval".

Islip Media, MediaKey Digital Video Library System Demonstration, NAB (1998) (Information Sheet) "Unlocking the Value of Video".

* cited by examiner

VIDEO CATALOGER SYSTEM WITH EXTENSIBILITY

PRIORITY

The benefit under 35 U.S.C. §119(e) of U.S. provisional application Ser. No. 60/055,751, filed Aug. 14, 1997, is hereby claimed.

RELATED APPLICATIONS

The subject matter of U.S. patent applications: application Ser. No. 09/134,497, filed Aug. 14, 1998 and entitled "VIDEO CATALOGER SYSTEM WITH SYNCHRONIZED ENCODERS"; application Ser. No. 09/134,499, filed Aug. 14, 1998 and entitled "VIDEO CATALOGER SYSTEM WITH HYPERLINKED OUTPUT"; and application Ser. No. 09/134,500, filed Aug. 14, 1998 and entitled "VIDEO CATALOGER SYSTEM WITH AUDIO TRACK EXTRACTION" are related to this application.

BACKGROUND OF THE INVENTION

1. Field of the Invention

The present invention generally relates to asset management of digital media, and more specificly, to a system and method for capturing and managing video and associated data.

2. Description of the Related Technology

Today's broadcast corporations, advertising agencies, consumer products and services companies, and other businesses have demanding media asset management needs. These organizations have been simultaneously empowered by the growth in tools and infrastructure for creating, storing and transporting media-rich files and challenged by the problem of managing the media assets that they've amassed and come to rely upon for their core businesses. The sheer volume of information available over the World Wide Web and corporate networks continues to accelerate. Because media assets are so crucial to these companies, they have an extreme need for an intelligent and efficient way to catalog, browse, search and manage their media assets. Prior attempts at a content management solution have yielded point solutions or proprietary applications. These applications have not leveraged the technologies already deployed by many organizations, such as industry-standard browsers and Web servers.

A system is needed that would automatically watch, listen to and read a video stream so as to intelligently extract information, termed metadata, about the content of the video stream in real-time. This information would become the foundation of a rich, frame-accurate index that would provide immediate, non-linear access to any segment of the video. Such a logging process would result in the transformation of an opaque video tape or file, with little more than a label or file name to describe it, into a highly leverageable asset available to an entire organization via the Internet. What was once a time consuming process to find the right piece of footage would be performed instantly and effortlessly by groups of users wishing to quickly and efficiently deploy video across a range of business processes. Television and film production, Web publishing, distance learning, media asset management and corporate communications would all benefit by such technology.

SUMMARY OF THE INVENTION

In one aspect of the invention, there is a media cataloging and media analysis application which performs real-time, or non-real-time, indexing and distribution of video across an enterprise. A multimedia cataloger is the first application to make video-based solutions pervasive in enterprise markets by creating and publishing intelligent video via the World Wide Web. The multimedia cataloger is the logical starting point for creating or distributing significant amounts of video. The cataloger transforms video into a powerful data type that is both compelling and profitable in both Web and client-server environments. Using advanced media analysis algorithms that automatically watch, listen to and read a video stream, the multimedia cataloger intelligently extracts metadata-keyframes, time codes, textual information and an audio profile from the video in real-time. This information becomes the foundation of a rich, frame-accurate index that provides immediate, non-linear access to any segment of the video.

In parallel to the indexing process, the multimedia cataloger may also optionally control the encoding of a streamable version of the original content. Synchronized encoding and indexing allows users to intelligently navigate through the video by using the index to go directly to the exact point of interest, rather than streaming it from start to finish. This approach provides video previewing that is faster than real-time, conserves valuable network bandwidth and dramatically reduces costs associated with editing and repurposing video.

The multimedia cataloger permits accessing and distributing media for digital television, Web publishing, distance learning or media asset management initiatives using advanced methods for accessing and leveraging media assets.

DETAILED DESCRIPTION OF THE PREFERRED EMBODIMENTS

The following detailed description of the preferred embodiments presents a description of certain specific embodiments to assist in understanding the claims. However, the present invention can be embodied in a multitude of different ways as defined and covered by the claims. Reference is now made to the drawings wherein like numerals refer to like parts throughout.

The detailed description is organized into the following sections: 1. Top Level System Overview, 2. Example User Interface, 3. Cataloger Configuration Detail, 4. Logging and Encoding, 5. Example Timeline, 6. Metadata Track Representation, 7. Metadata Index Object Model, 8. Cataloger Architecture, 9. Extensible Video Engine Architecture, 10. Audio Feature Extractors, 11. Extensible Video Engine Start-up Initialization, 12. Video Encoding and Metadata Synchronization, 13. Capture Metadata, 14. Feature Extraction, 15. HTML Output Filter Architecture, 16. HTML Output Filter Process, 17. Example HTML Output, 18. Alternative System. Before describing the detailed internal engineering of the inventive system, a top level system overview will be helpful.

1. Top Level System Overview

Figure 1:
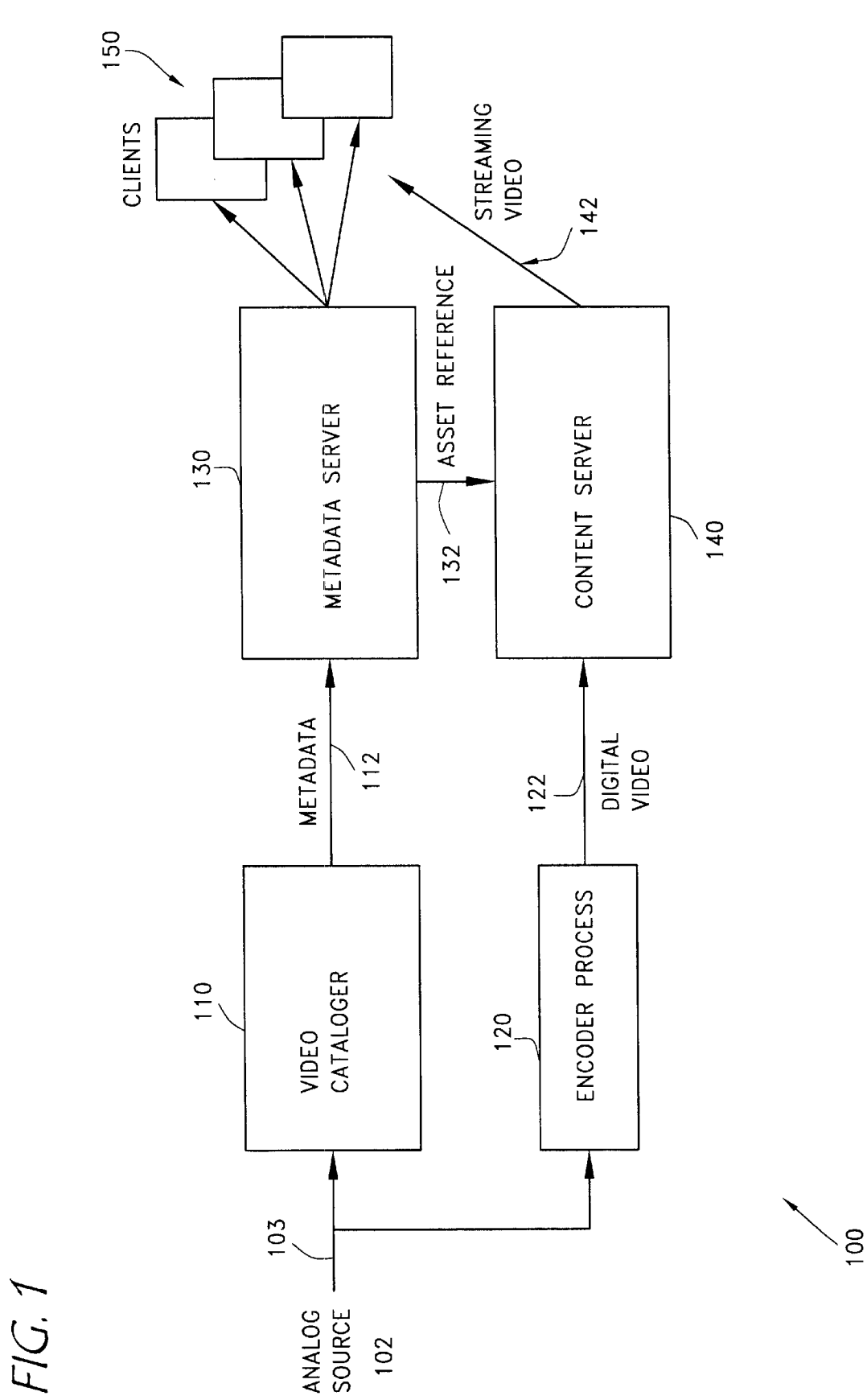
FIG. 1 is a block diagram of one embodiment of a multimedia cataloger system of the present invention.

FIG. 1 depicts a typical system 100 that incorporates a Video Cataloger 110. The Video Cataloger 110 typically operates in a networked environment which includes data communication lines 112, 122, 132, and 142. Some variants of such a system include:

Analog Sources 102: may be any of a number of possible sources, such as an analog or digital tape deck, a laser disc player, a live satellite feed, a live video camera, etc. A video signal, such as NTSC or PAL, is all that is needed for input into the Video Cataloger 110.

Metadata Server 130: may be as simple as a file system containing hypertext markup language (HTML) files, or as complex as a relational database supporting a client-server application environment for media management. Client interfaces may be HTML web browsers, Java, or native client applications, for example.

Digital Video Encoding 120: the existence of digital video is an optional component. It may be the case that the metadata merely indexes video that resides on analog video tapes stored on shelves.

Content Server 140: may be as simple as a file system containing digital video files, or as complex as a digital video stream server such as those offered by Real Networks, Silicon Graphics Mediabase, Oracle OVS, and the like.

Digital Video Formats: digital video data is encoded by an encoder process 120 and communicated to the Content Server 140 over a network channel 122. The format of the digital video may be any of a wide variety of formats, such as Real Video (at various bit rates from 20 kbps up to 500 kbps), MPEG-1 (at various bit rates up to 3.5 mbps), MPEG-2 (at various bit rates up to 40 or 50 mbps), MPEG-4, MPEG-7, Motion JPEG, Apple QuickTime, Microsoft AVI, and so forth.

2. Example User Interface—Screen Shot

Figure 2:
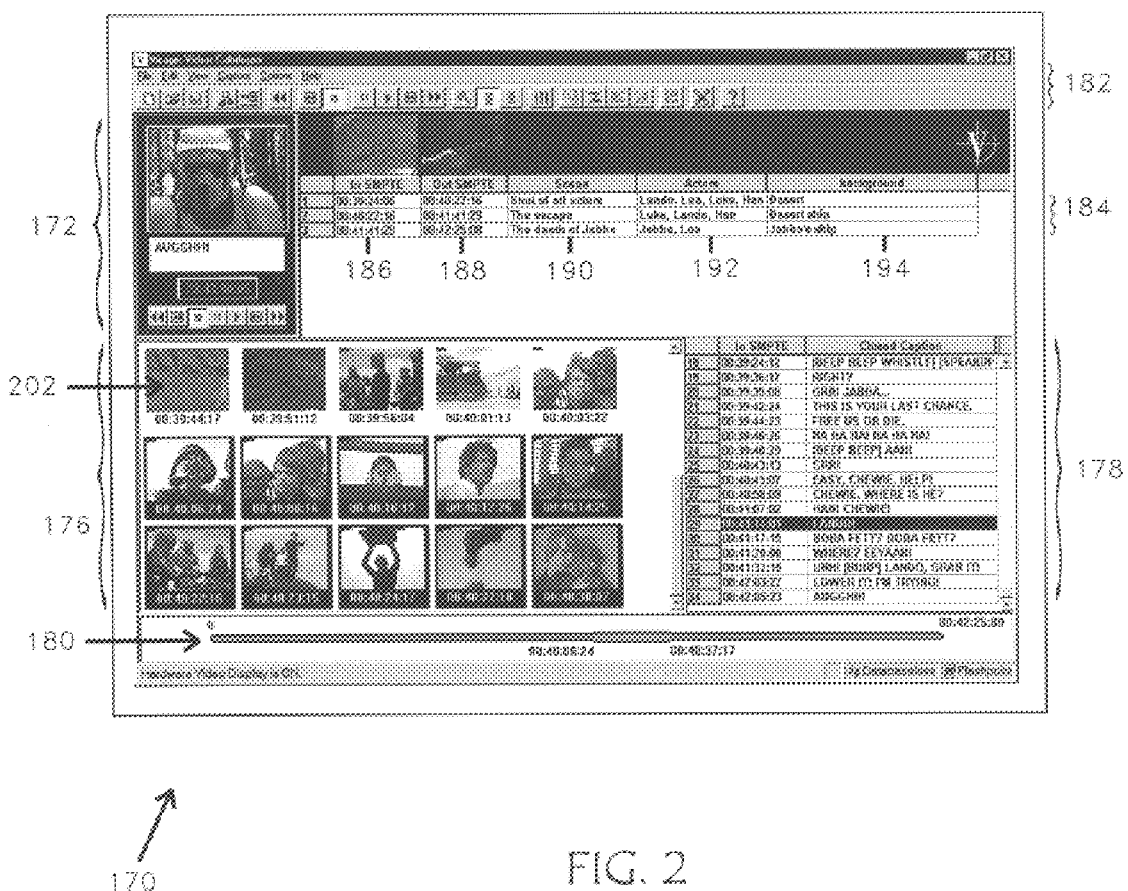
FIG. 2 is an exemplary screen display of a user interface for the multimedia cataloger system shown in FIG. 1.
Figure 3:
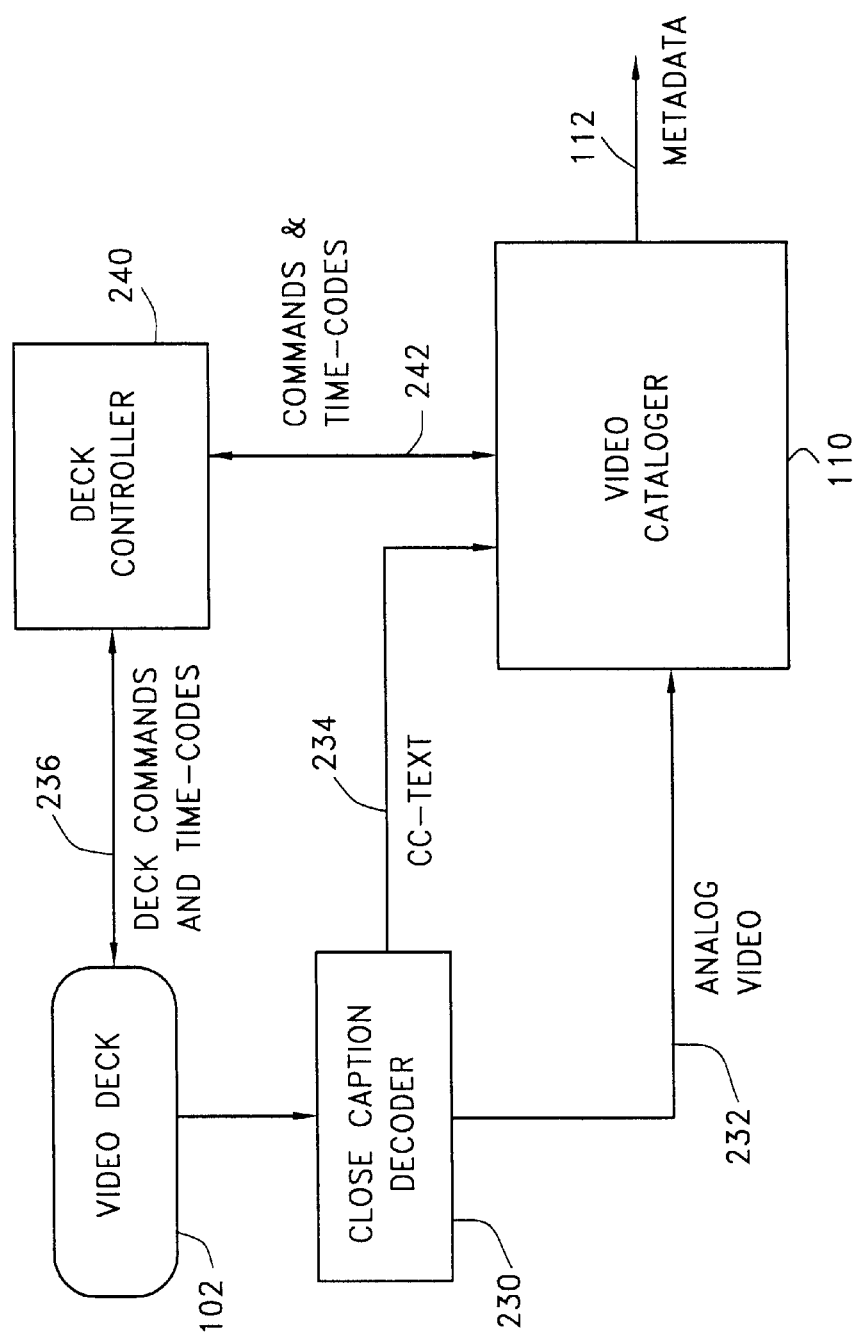
FIG. 3 is a block diagram of exemplary input and peripheral components for the multimedia cataloger system shown in FIG. 1.
Figure 9:
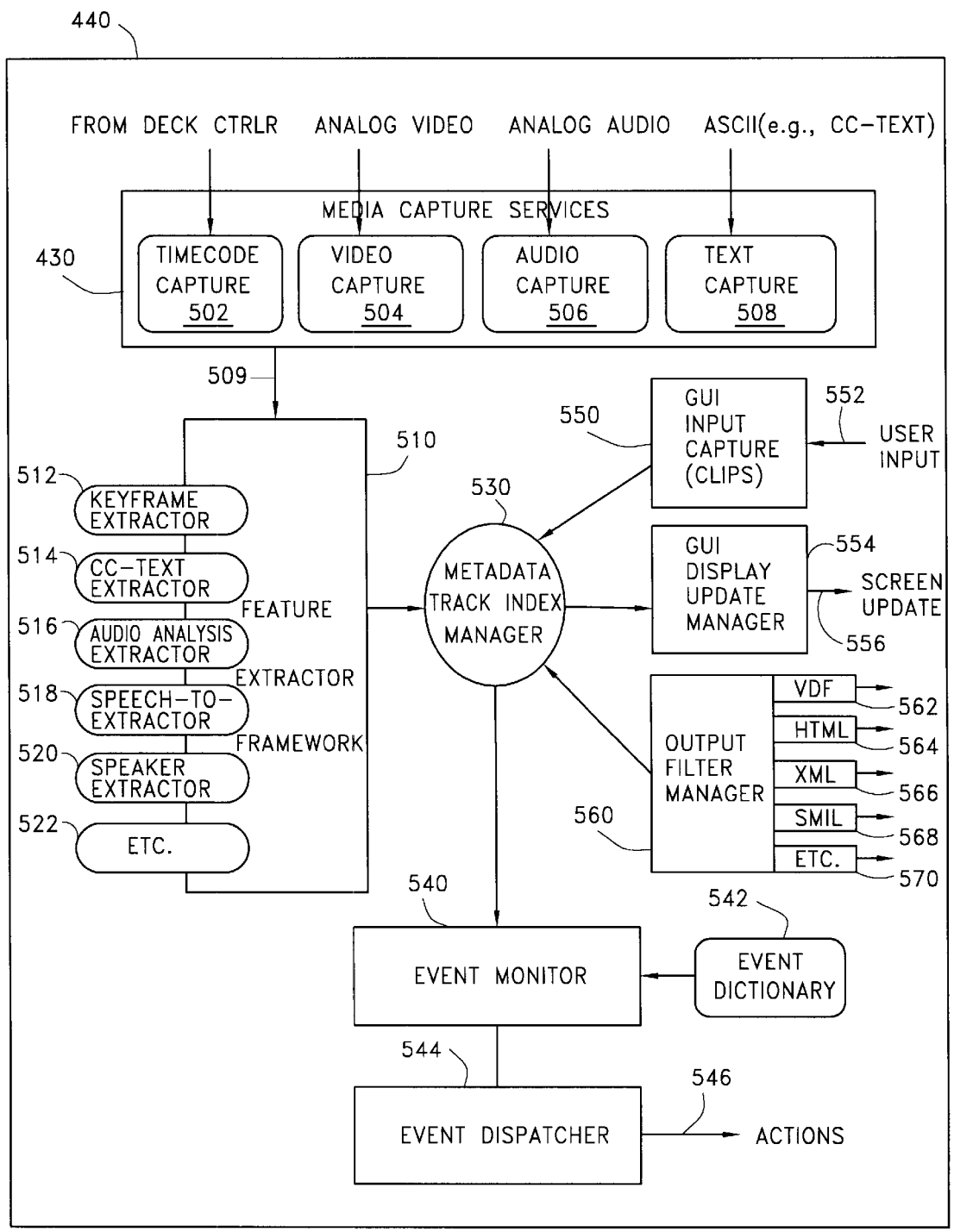
FIG. 9 is a block diagram of the elements of the extensible video engine shown in FIG. 8.

FIG. 2 depicts an example user interface that is representative of the type of graphical user interface (GUI) than could be built around the Video Engine shown in FIG. 9. In FIG. 2, the Video Cataloger user interface is contained in a window 170. The main controls are exposed as menus and a tool bar 182. A panel 172 displays the live video being digitized, with play, stop, etc. controls that interact remotely with the analog source via a deck controller 240 (FIG. 3). Keyframes extracted during the capture process are displayed in a panel 176, while the corresponding close-caption text and timecodes are displayed in a panel 178. A panel 184 displays the user-defined clip annotations, created by marking in- and out-points. The columns 186 and 188 display the in- and out-time codes for the marked clip, respectively, while the remaining columns 190, 192, 194 are an example of a user defined schema of labels to describe the clip. Finally, at the bottom of the window 170 is a timeline 180 that depicts the total time of the capture session, with a highlighted section corresponding to the currently selected range of keyframes.

3. Cataloger Configuration Detail

FIG. 3 depicts a typical configuration of the Video Cataloger 110 connected to various peripheral devices that interface the Cataloger to an analog source such as the videotape deck 102, a Deck Controller 240, and a close caption decoding device 230. The deck controller 240 is typically an external device that provides protocol translation between an industry standard protocol such as V-LAN, and the native protocol of broadcast devices (such as tape decks) from Sony, Panasonic, etc. An example device is the Video Media Express from Video Media Corp. Some hardware configuration may incorporate the V-LAN controller into a card in the Cataloger workstation, for instance.

The close caption text decoder 230 can be an external box as shown, (such as EEG Enterprises Digital Recovery Decoder), or the CC-text decode functionality can be incorporated on the frame capture board inside of the Cataloger workstation. Furthermore, the video signal may be routed through the close caption text decoder 230 (as shown), or it may be split and fed directly to both the video Cataloger 110 and the decoder in parallel.

The Video Deck 102 is one example of an analog source. Several others are possible: laser disk, satellite feed, live camera feed, digital disk recorder such as a Tektronix Profile, etc. Some of these configurations would not incorporate the V-LAN control (such as a live or satellite feed).

Analog signals 232 may be fed from the Video Deck 102, through the close caption decoder 230, into the Video Cataloger 110. The analog signals correspond to video information which generally includes audio information. Decoded close caption text is passed to the Video Cataloger 110 by a data connection 234 which is typically an RS-232 cable. Deck commands pass from the Video Cataloger 110 to the Deck Controller 240, and then to the Video Deck 102 by physical data connections 236 and 242 which are typically RS-232 serial connections, but may be other signaling protocols. The time codes proceed from the video deck 102 to the video cataloger 110 via the deck controller 240. Of course, in alternate implementations, the Video Cataloger 110 may receive video information from a digital source such as a digital camcorder.

4. Logging & Encoding—detail

Overview

Figure 4:
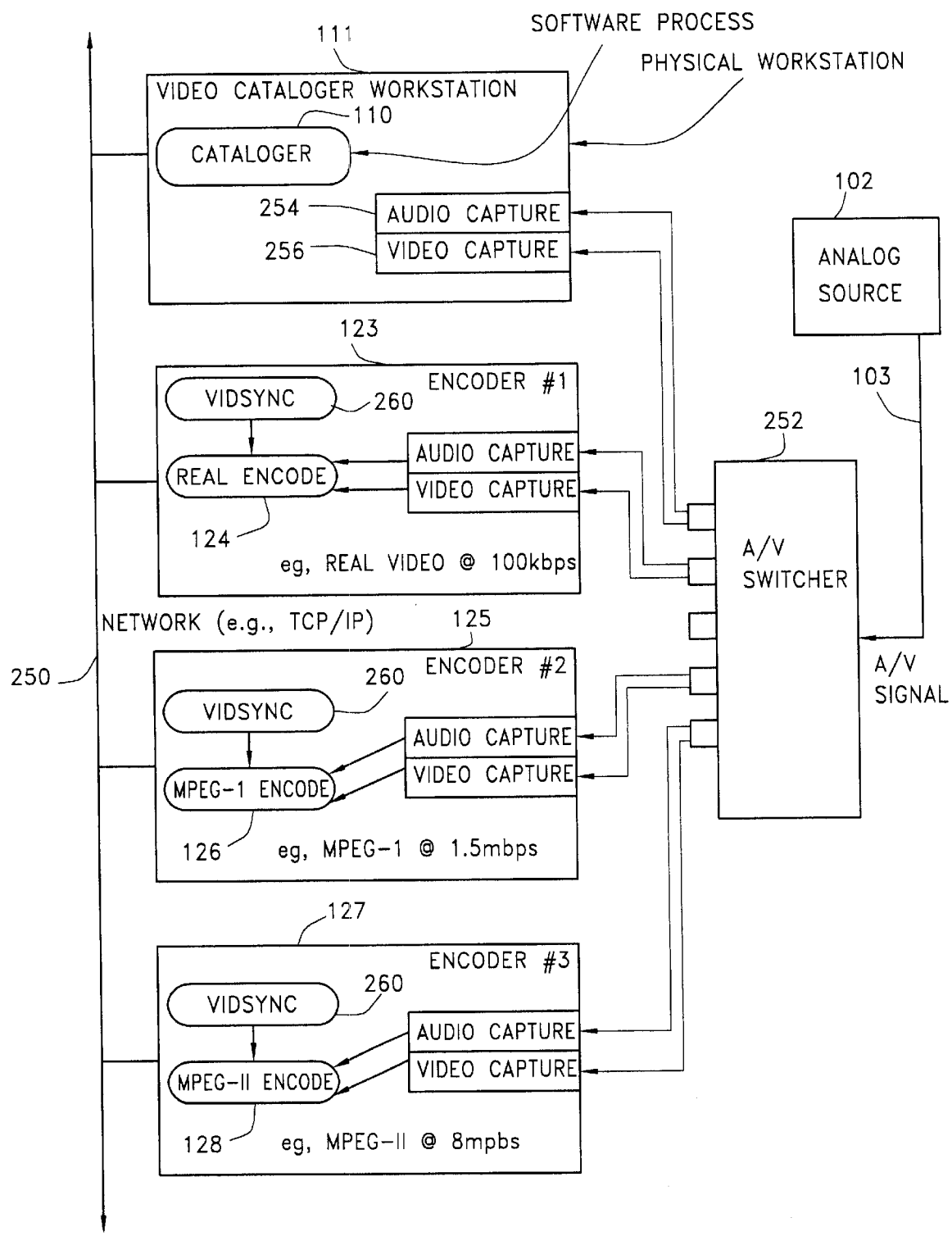
FIG. 4 is a block diagram of exemplary components and processes used in the cataloger and encoder portion of the multimedia cataloger system shown in FIG. 1.

FIG. 4 depicts one of a great variety of possible encoding scenarios, driven by the Video Cataloger. The Video Cataloger software 110 runs on a computer workstation 111. The "Vidsync" process 260 running on each of the encoder workstations 123, 125, 127 is responsible for responding to Start and Stop commands from the Video Cataloger 110, and affecting the start and stop of the corresponding encoding process on each workstation. The analog source 102 will typically need to be split by an audio-video switcher 252 so that the signal can be fed to each receiving workstation without degradation. FIG. 4 shows examples of Real Video encoding 124, MPEG-1 encoding 126, and MPEG-2 encoding 128. Further information on the Moving Pictures Experts Group (MPEG) encoding standards may be found at the following URL: http://drogo.cselt.stet.it/mpeg. Naturally, other encoding formats are possible. All machines are connected by a data network 250, which is typically a TCP/IP network, although other network protocols may be employed. Some of the many variations for encoding scenarios include:

a. Incorporation of an encoder hardware board 126 (such as an MPEG-1 encoder from Optibase, Minerva, etc.) directly inside the Video Cataloger workstation 111. Because most of the computation occurs on the dedicated board, this is feasible in practice)

b. Use of a stand-alone "black-box" encoder such as those from Lucent and Innovacom for MPEG 1, which do not require a workstation. The black-box simply accepts an analog input, and a network connection to deliver the MPEG data packets to a video server. These boxes are typically rack mounted, and can be configured with up to eight encoders per enclosure. This is ideal for large scale encoding scenarios where several feeds or tape decks must be encoded.

c. Using one, two, or N encoders simultaneously. For simple browse applications, a single encoded proxy is all that is needed. For web publishing applications, publishers typically want to encode a low-resolution stream (such as Real Video at 20 kbps) and a high resolution stream (such as Real Video at 100 kbps) to service different users having different Internet connection bandwidths.

Command Structure

The Cataloger 110 issues commands to each of the Vidsync daemons 260 running on the encoder workstations. These daemons, or processes that are periodically spawned to carry out a specific task and then terminate, are responsible for initiating the encoding process for whatever type of encoding is going to occur. That is, intimate knowledge of the encoding is maintained in Vidsync, and the Cataloger is generic in this respect. The Vidsync daemons also are responsible for returning certain pieces of information to the Cataloger, such as the actual start time, and a digital video asset ID or name for later use.

START Command: The Cataloger 110 issues a "start encoding" command via TCP/IP to each of the encoders (Vidsyncs) in parallel. Each of the Vidsyncs 260 then communicates with whatever software and hardware encoding processes/boards are required to initiate encoding. This may also involve communicating with a video server to set up an encoding session, and may take from 1 to several seconds. Thus, each encoder process may have a different actual start time. The Vidsync daemons then return the actual start time and a digital video asset ID to the Cataloger 110. When all Vidsyncs 260 have returned, the metadata capture begins at a nominal T=0 time. Each of the actual start times is stored as a delta-time from this T=0 time. When a piece of metadata (such as a keyframe) is used to index the digital video, an absolute time from the beginning of the digital video is computed by adding the delta-time to the time-code of the metadata.

STOP Command: The Video Cataloger 110 issues a "stop encoding" command via TCP/IP to each of the encoders in parallel.

5. Example Timeline

Figure 5:
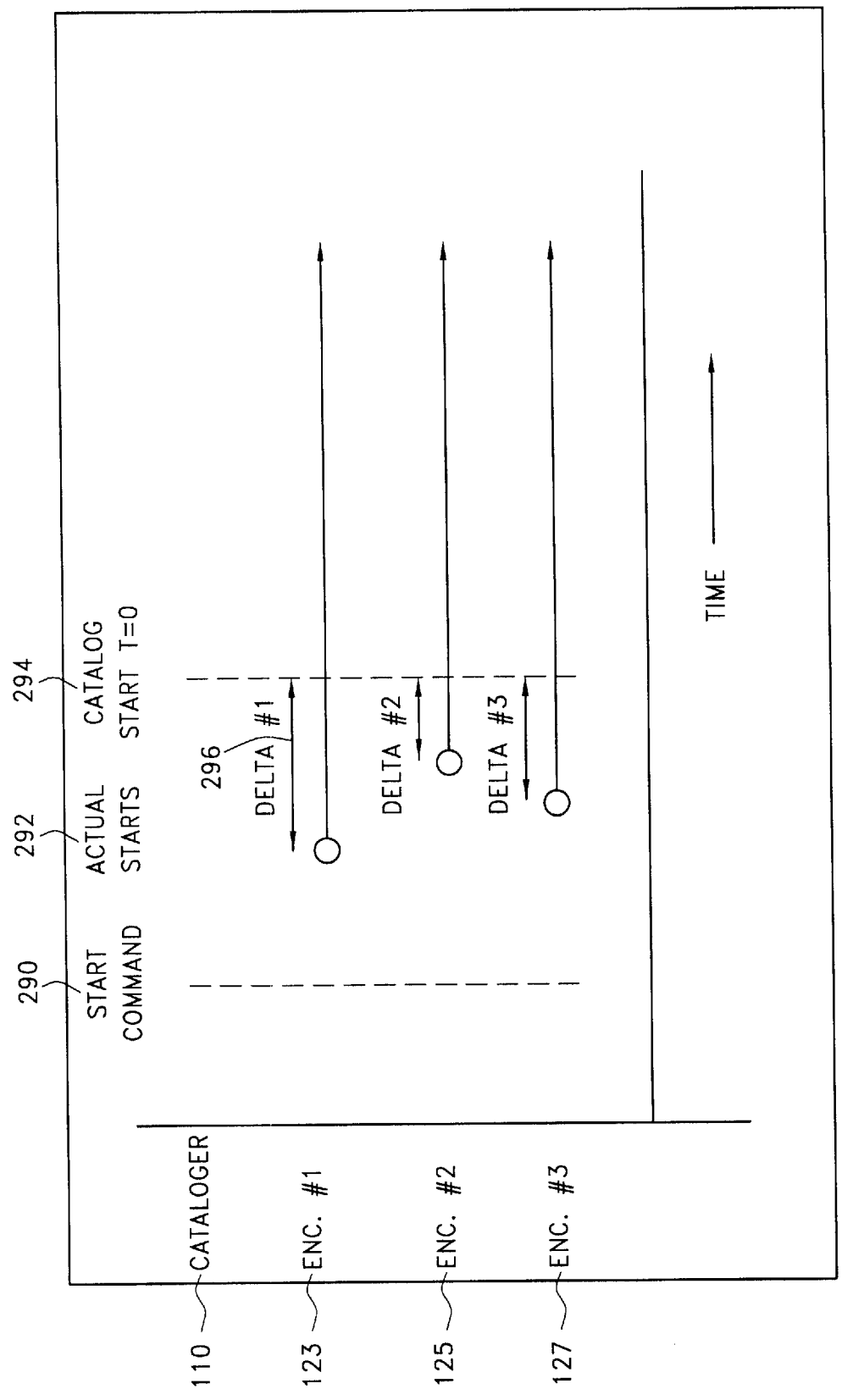
FIG. 5 is an exemplary timeline of encoder start-up and synchronization for the components and processes shown in FIG. 4.

FIG. 5 illustrates the timing associated with video encoder start-up and synchronization. Each timeline 123, 125, 127 represents a separate video encoder. The Video Cataloger 110 issues a Start Command 290. Some time after that, each encoder actually begins encoding, resulting in an "actual start time" 292. After all the encoders have started, the Video Cataloger 110 itself begins cataloging metadata, at a time nominally labeled "T=0" 294. Thus, each encoder has a start offset 'delta' time 296. This delta time is then stored with the video metadata to be used later when a video stream is requested, to insure the offset is accounted for in time code calculations.

6. Metadata Track Representation

Figure 6:
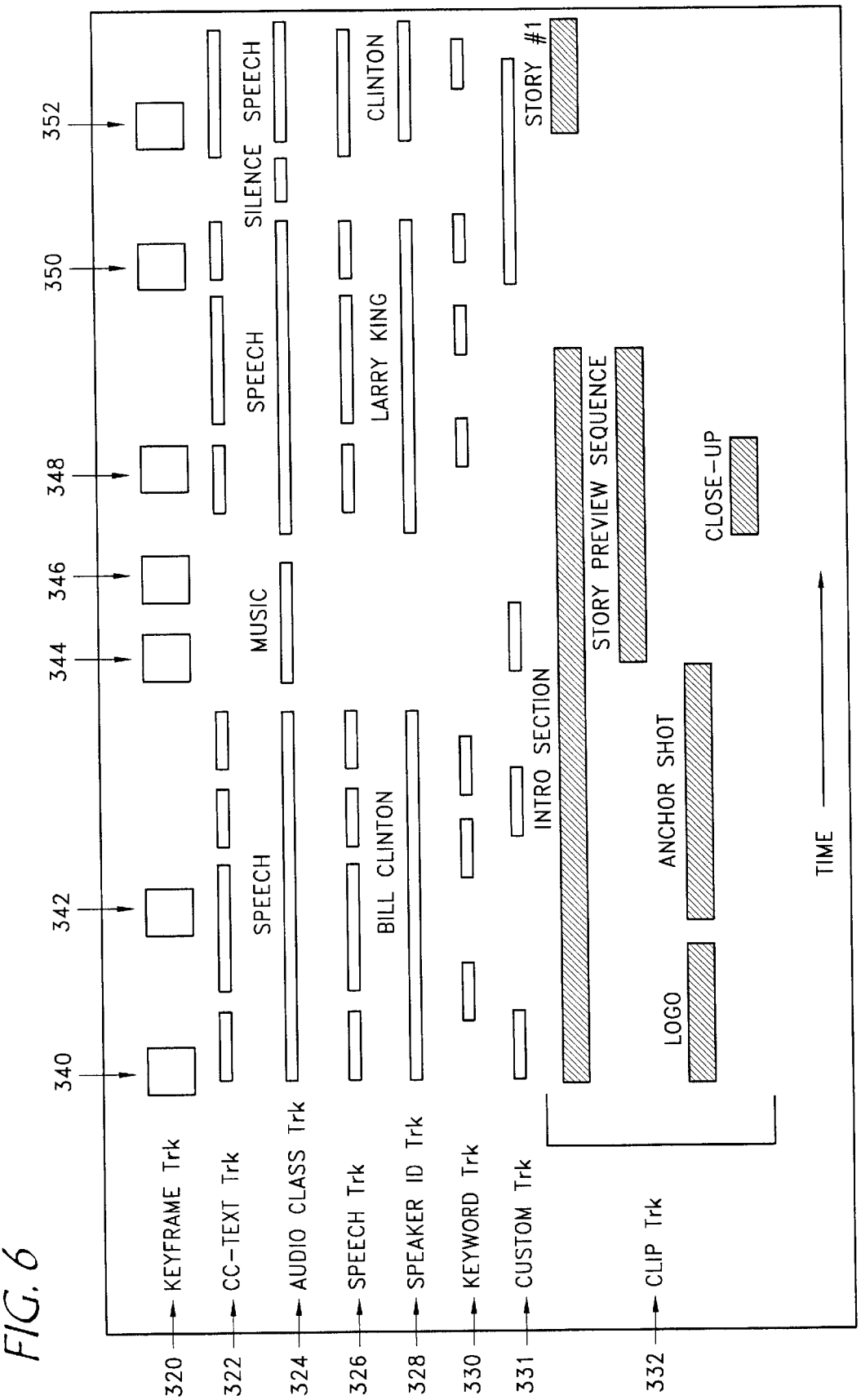
FIG. 6 is a diagram of an exemplary set of metadata types in a time-based track representation as derived by the cataloger of the multimedia cataloger system shown in FIG. 1.

FIG. 6 is a logical illustration of a number of metadata types in the form of the preferred time-based track representation. The keyframe track 320 consists of a set of individual keyframes 340, 342, 344, 346, 348, 350, 352 which have been intelligently extracted from the video based on visual information and scene changes by the Keyframe Extractor 512 (FIG. 9). Each keyframe is time stamped for later correlation with the digital video or a time-code on a videotape.

The close caption text (cc-text) track 322 consists of sentences of text parsed from the cc-text input by the cc-text extractor 514 (FIG. 9). Each text element spans a period of time in the video, denoted by an in-time and an out-time.

Likewise, the remaining metadata tracks (Audio Classes 324, Speech 326, Speaker ID 328, Keywords 330) are each a parcel of metadata spanning a time period, and are extracted by their corresponding feature extractor shown in FIG. 9.

The Clip Track 332 is somewhat unique in that the definition/creation of this metadata is performed by a user using the GUI to mark in- and out-times, and type in associated alphanumeric data. Each bar in the Clip Track consists of a user-defined group of metadata fields that are application specific. The bar length is timespan from intime to outtime. Clips may be overlapping. Typically, the clips all have the same schema. For instance, metadata may include: Story Title, Report, Location, Shot Date, Air Date, Keywords, Summary, and so on. Each bar shows a clip label. So for instance, the clip labelled "Logo" may make use of the Story Title data item. Lastly, a Custom Trk is shown to indicate that metadata is extensible. That is, unique metadata can be defined and added to the Video Cataloger 110 by a user. Custom metadata tracks could include information provided in collateral data to the video information. For instance, global positioning satellite (GPS) data specifying latitude and longitude of a video camera and telemetry data of a vehicle carrying a video camera are examples of such collateral data.

7. Metadata Index Object Model

Figure 7:
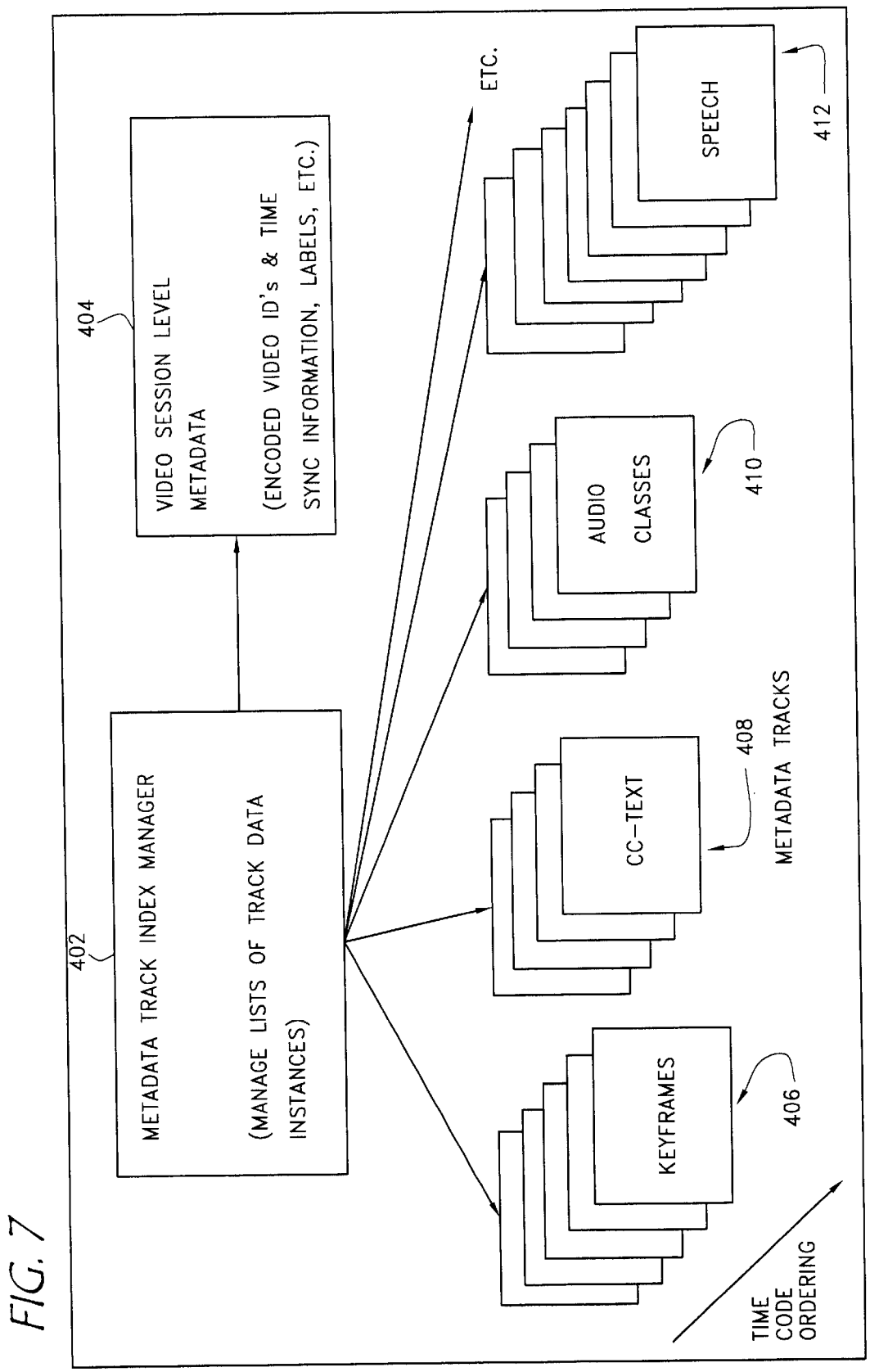
FIG. 7 is a block diagram of an object model for the metadata shown in FIG. 6 along with a software process that manages the metadata.

FIG. 7 is an Object Model of the same logical metadata illustrated in FIG. 6. The elements of this diagram depict the software objects and processes that manage this metadata. The main object, the Metadata Track Index Manager 402, is the manager of the entire index of metadata. It is extensible in that it allows registration of individual metadata track data types, and then manages the commitment of instances of that data into the index by feature extractors. There is one global metadata structure (the Session Level metadata 404) that is not time based, and contains metadata that pertains to the entire video. Here, for example, is where the information for managing and time-synching the encoded video resides (digital video ID's and actual start time offsets). User defined annotations may also exist here. Each of the metadata tracks is a collection of data objects 406, 408, 410, 412, etc. that hold the metadata for a specific feature extractor, and are sequenced in time according to their in- and out-times.

The metadata index also provides access for outputting metadata (data read-out) used by the Output Filters.

In an object oriented programming implementation, every Track data type is derived from a "virtual base class" that provides the basic functions for insertion, deletion, read-out, etc., and defines storage for the in-time and out-time of each metadata element. Such an implementation may be coded in the C++ programming language. One exemplary reference guide is C++ Primer by Stanley Lippman, Second Edition, Addison Wesley, which is hereby incorporated by reference.

TABLE 1

Track Data Types

| Track | Metadata Data Type | Notes |
| --- | --- | --- |
| Virtual Base Class | untyped (void*) | Defines In-time and Out-time for all tracks |
| Keyframe Track | image (bitmap) | In-time equals Out-time, i.e., keyframe is a point in time |
| CC-text Track | Text fragment | Each text fragment is typically a sentence (but not required to be so) and spans a time interval |
| Audio Class Track | Enumerated Classes | Speech, Silence, Music, Applause, Siren, etc . . . , each spanning a time interval when that classification was valid |
| Speech Track | Text fragment | Each text fragment spans a time interval |
| Keyword Track | Word (text) | keyword utterance spans a short (½ sec) time interval |
| Speaker ID Track | Enumerated Classes | Identifiers of individuals whose speech is recognized . . . each Speaker ID spans a time interval when that speaker was speaking |
| Clip Track | Label Set (user defined set of labels): Text, Enums, Dates, Numbers, etc. | Different Label Set schemas can be used in different applications. Each Label Set is applied to all clips within a Cataloging session. The Clip definition spans a time interval marked |

TABLE 1-continued

Track Data Types

| Track | Metadata Data Type | Notes |
| --- | --- | --- |
| | | by the user. Each Label field value is entered manually by the user. |
| Custom | Data type defined by plug-in | Typically, a custom metadata generator uses a custom track data type for storing its metadata. It could also re-use existing track data types such as Text Fragment. |

Table 1 is a summary of the various standard metadata tracks, detailing the data types of each, and providing descriptive notes.

8. Video Cataloger—Architecture

Figure 8:
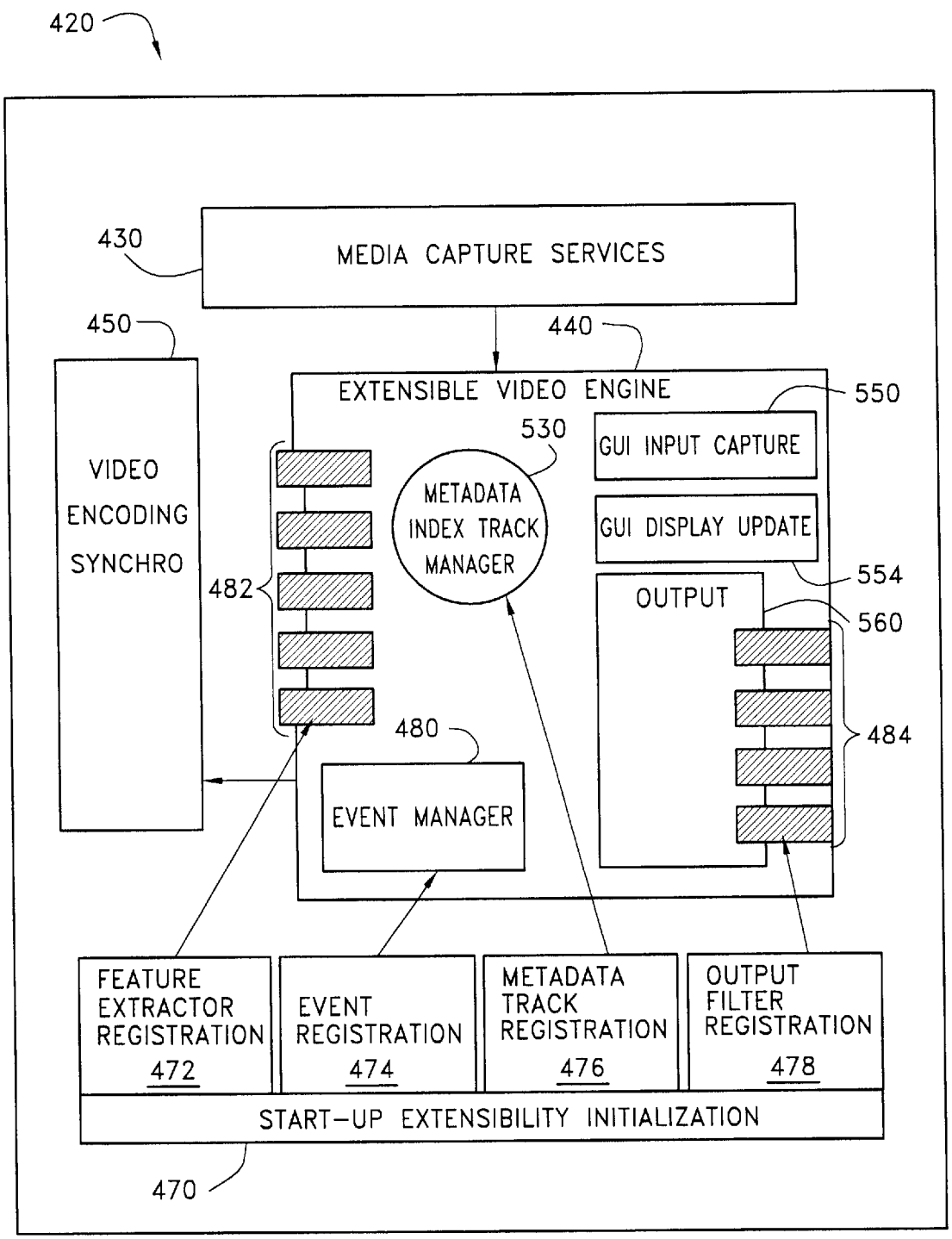
FIG. 8 is a block diagram of the software architecture for the cataloger of the multimedia cataloger system shown in FIG. 1.

FIG. 8 is a global architecture illustration of the entire Video Cataloger software process 420. The main components of this software are the Media Capture Services 430, the Video Encoding and Synchronization facility 450, the Start-up Extensibility Initialization manager 470, and the core Extensible Video Engine component 440. The details of the core Extensible Video Engine 440 are provided in FIG. 9. The Video Encoding and Synchronization module 450 is responsible for communicating with the "Vidsync" daemon processes running on the video encoders, e.g., 123, 125 and 127 (FIG. 4). The Media Capture Services 430 are further described in conjunction with FIG. 9.

The registration interfaces for the extensible aspects of the Extensible Video Engine 440 are explicitly shown in FIG. 8. Upon start-up of the Video Cataloger 110, registration processes are invoked for the four primary extensibility aspects of the Video Cataloger: Metadata track registration 476, Feature Extractor registration 472, Output Filter registration 478, and Event registration 472. A set of output filters 484 are installed during system start-up. These registration processes, as well as user input and output functions 550, 554, are further described in conjunction with FIG. 11 below.

9. Extensible Video Engine—Architecture

FIG. 9 depicts the main architectural elements of the extensible Video Engine 440. Incoming media is processed by the Media Capture Services 430 consisting of Timecode Capture 502, Video Capture 504, Audio Capture 506, and Text Capture 508. Digital media 509 is then made available to the Feature Extractor Framework 510 for processing. Metadata from the Feature Extractors 512, 514, 516, 518, 520, 522 is then committed to the Metadata Track Index Manager 530 in a time based track representation as shown in FIGS. 6 and 7.

During metadata capture, the user may mark video clips and annotate them. This input 552 is captured by the GUI Input Capture element 550. Event monitoring 540 and dispatch 544 also occurs during capture, driven by an Event Dictionary 542. Finally, when capture is complete, the metadata may be output in a variety of formats such as Virage Data Format (VDF) 562, HTML 564, XML 566, SMIL 568 and other 570, which are managed by the Output Filter Manager 560. A VDF API and Toolkit may be licensed from Virage of San Mateo, Calif. Furthermore, the use of the format is described in "Virage VDF Toolkit Programmer's Reference". One reference for the extensible Mark-up Language (XML) is the following URL: http://www.w3.org/TR/

REC-xml which is a subpage for the W3C. Also, information on Synchronized Multimedia Integration Language (SMIL) may be accessed at the W3C site.

The Metadata track Index Manager 530 represents the object that manages the multiplicity of metadata tracks. When data is committed to the track index by either a feature extractor 512–522 or GUI input 550 and 552 (i.e., user marks clips and annotates them), this can trigger display updates as follows: the particular metadata track that receives the data decides if this requires a display update. If so, it sends a message to the GUI Display Update Manager 554 which marks the relevant GUI object as "dirty" and in need of a redraw. In Windows Microsoft Foundation Classes (MFC), the event model allows Windows to detect these dirty GUI objects and issue redraw messages to them directly (see FIG. 12—Get Event)

The core aspects of extensibility are:

Extensible Track data types are registered with the Metadata Track Index Manager 530. Any desired data representation can be defined and installed, such as region markers, OCR text and confidence values, face identifiers, camera parameters (pan, tilt, zoom), etc. Any property that a feature extractor chooses to extract can be placed in a custom metadata track.

Extensible Feature Extractors can be registered with the Feature Extractor Framework 510 to operate on digital media, or on any collateral data they may choose to collect when called.

Extensible Event triggers: event criteria (e.g., cc-text=="clinton", or audio_class=="tone") can be registered in the Event Dictionary 542, and arbitrary actions can be registered and triggered (e.g., grab a keyframe right then, or stop capture). The Event Monitor 540 monitors the incoming metadata to decide if an event is triggered. If so, it sends a message to the Event Dispatcher 544 which invokes the corresponding action 546 for the event.

Extensible Output Filters may be registered with the Output Filter Manager 560. Further discussion of Output Filters is provided below with respect to FIGS. 15 and 16.

Figure 10:
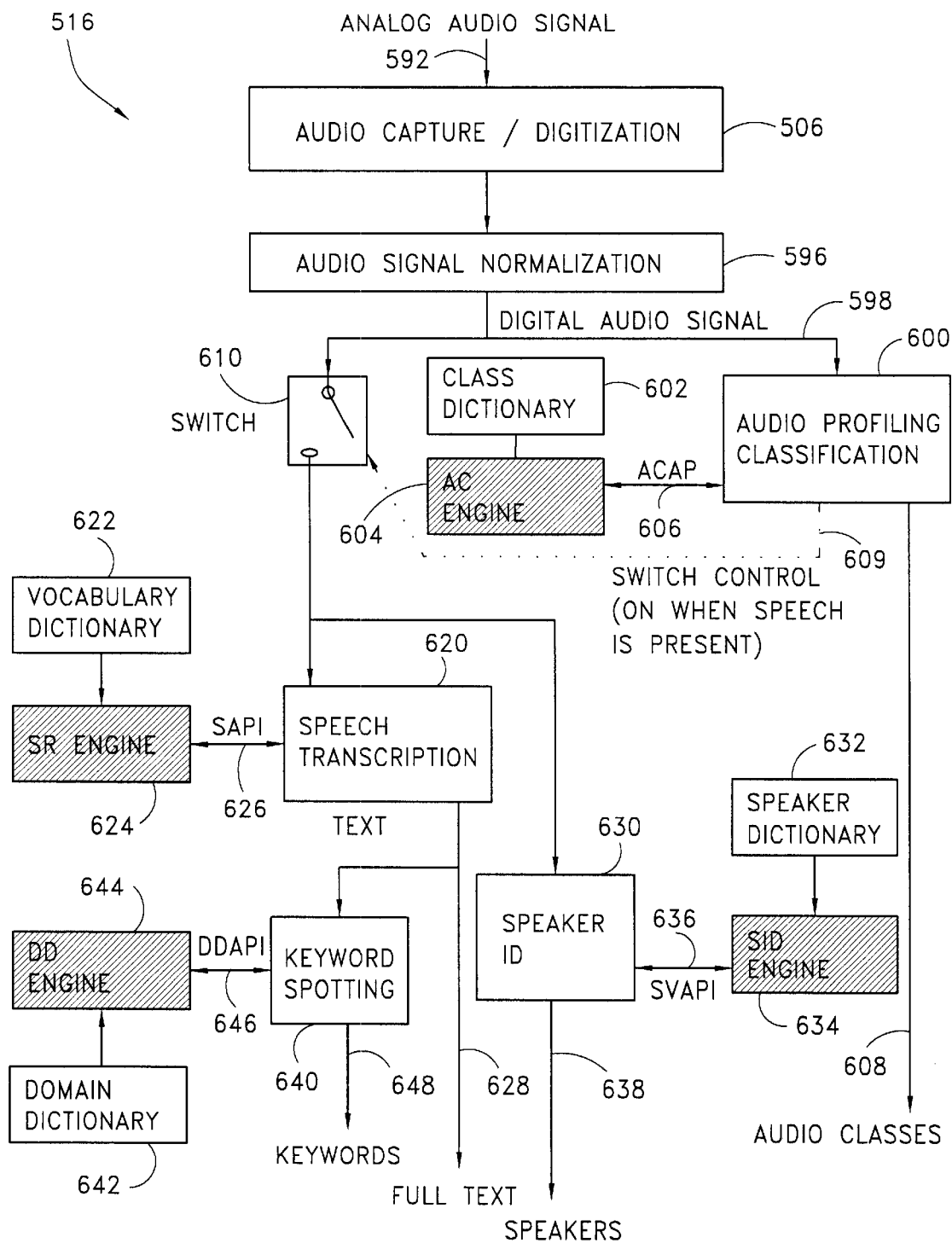
FIG. 10 is a block diagram of the audio analysis extractor shown in FIG. 9.

Time code capture 502 is typically via VLAN (as in FIG. 3), but may come from a variety of sources. Time code capture is another aspect of extensibility (though not core) since we have a plug-in for time-code extraction 10. Audio Feature Extractors FIG. 10 depicts the architectural components of the audio analysis feature extractors 516 in one embodiment of the Video Engine 440. As can be seen in the diagram, there are various cross-couplings between these feature extractors, which may not be precluded in the extensibility mechanisms managed by the feature extractor framework 510 (FIG. 9).

The analog audio signal 592 is captured and digitized by audio digitization device 506, which may be any standard audio digitization device, such as a Sound Blaster audio card for a PC. The digital signal is then normalized by a software component 596 to account for variability in signal amplitude (volume). The normalized digital audio signal 598 is then fed into an Audio Class Profiler 600 which classifies the signal into one of several possible categories, such as "speech", "music", "silence", "applause", etc., where each of the categories may be trainable using well understood techniques, and is stored in a Class Dictionary 602. An Audio Classification (AC) Engine 604 is a modular component that is available from multiple vendors, or may be proprietary. One skilled in the relevant technology may evaluate and utilize a specific engine depending on the application requirements.

When the Audio Class Profiler 600 detects that the class is "speech", it triggers switch 610 which then allows the normalized digital audio signal 598 to pass into additional feature extractors which are capable of processing speech. A speech transcription module 620 is designed to interface with any available Speech Recognition Engine 624 using an industry standard interface 626, such as the "Speech API", or SAPI defined by Microsoft. Typically, the Speech Recognition Engine 624 utilizes a Vocabulary Dictionary 622 to aid in the speech recognition process and improve accuracy by limiting the speech domain, although this is not required. It is a typical feature of existing speech recognition engines available on the market today. Examples include offerings from IBM, BBN, Dragon Systems, SRI, and so on.

The output of the Speech Transcription Feature Extractor 620 may then be further processed as follows: the full text 628 of the transcription process may be used directly as metadata; additionally, a Keyword Spotting Feature Extractor 640 may be employed to selectively identify keywords of interest, and produce a text output 648 limited to the keywords specified by a Domain Dictionary 642. A Domain Dictionary Engine 644 is responsible for making these selections. Again, the Domain Dictionary 644 Engine is typically a modular component that may be one of several available, interfacing with the Keyword Feature Extractor normally via a standard interface 646 such as the Domain Dictionary API, or DDAPI.

The normalized digital audio signal containing speech can also be fed into a Speaker ID Feature Extractor 630 to identify individual speakers by name. A Speaker ID Engine 634 may also be a modular component that is offered by several speech recognition vendors, and interfaces with the Speaker ID Feature Extractor 630 typically via an industry standard interface 636 such as the SVAPI. Typically, the Speaker ID Engine utilizes a Speaker Dictionary 632 to constrain the space of possible speakers, and store signatures or sample speech of individual speakers which are used during speaker identification.

11. Extensible Video Engine Start-up Initialization—Flowchart

Figure 11:
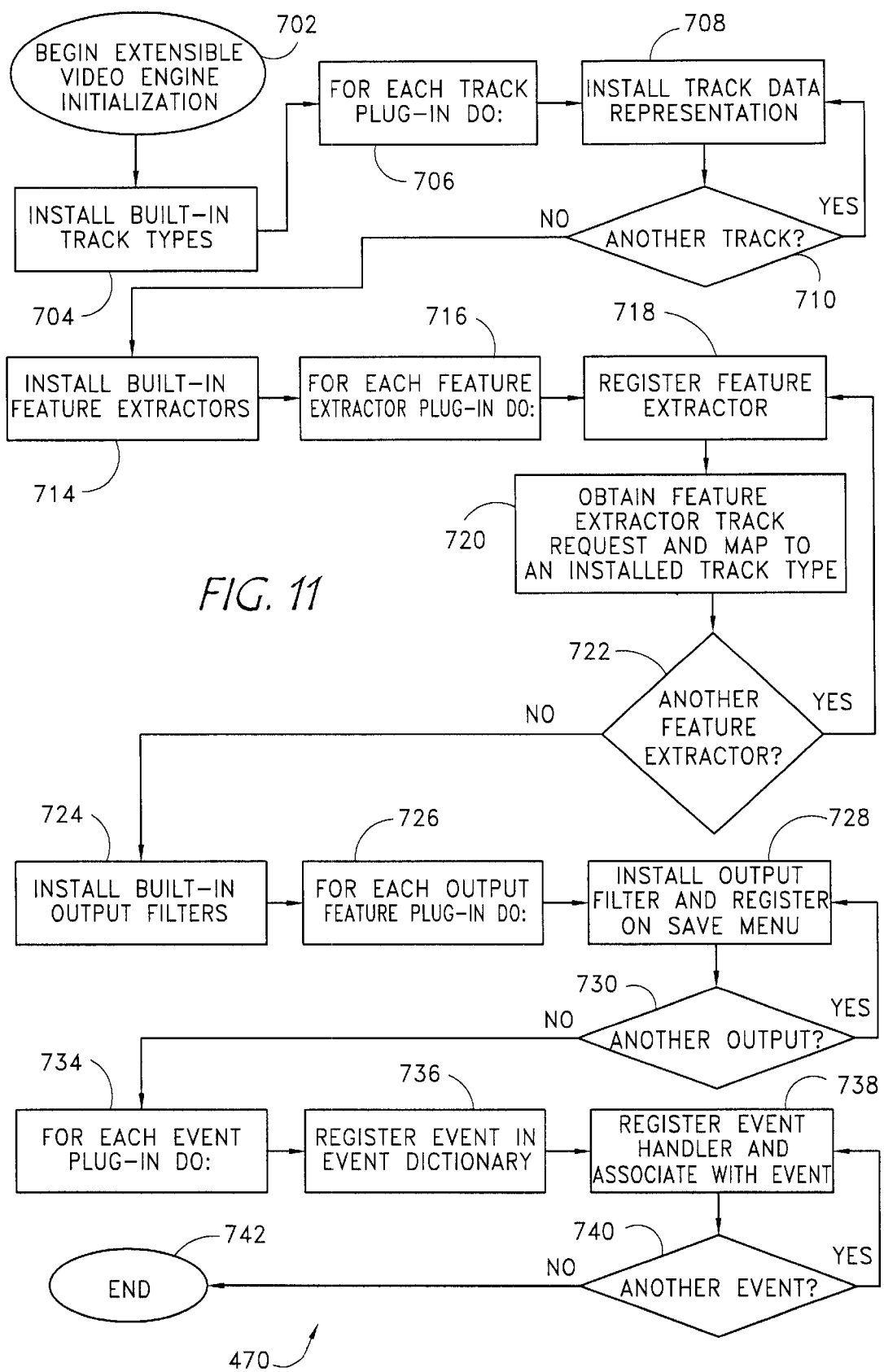
FIG. 11 is a flowchart of the extensible video engine initialization (start-up extensibility initialization) process shown in FIG. 8.

FIG. 11 is the process flowchart for the start-up initialization of the Video Cataloger 110 (FIG. 1). This flowchart depicts the process for registering data types, algorithms, and events which are important to the extensibility features of the Video Cataloger 110.

Upon start-up of the Video Cataloger, the extensible video engine initialization process 470 is executed by the workstation 111. Starting at a begin step 702, the process 470 moves to step 704 to install metadata tracks. This occurs first since later extensions (mainly Feature Extractors) may then utilize the track data types previously installed. Built-in Track Types are installed first at step 704, followed by installation of custom track types defined by plug-in modules at steps 706 to 710. For each track plug-in, the data representation defined by that plug-in is installed at step 708.

Next, feature extractors are installed. The built-in feature extractors are first installed at step 714, followed by feature extractors defined by plug-ins at steps 716 to 722. For each plug-in feature extractor, it is first registered at step 718 with the Feature Extraction Framework 510 (FIG. 9). At step 720, each of these plug-in feature extractors may request a metadata track type to receive its metadata.

Following the feature extractor initialization, the Output Filters are initialized. As with the other elements, the built-in Output Filters are installed first at step 724, followed by the installation of plug-in Output Features at steps 726 to 730.

Finally, Events are registered. All events are application specific (i.e., there are no built-in events), and are registered by plug-ins starting at steps 734 to 740. Each plug-in may define one or more events in the dictionary at step 736, and each event will have an associated event handler registered with it at step 738. The extensibility initialization process 470 completes at an end step 742.

12. Video Encoding/Synchro—flowchart

Figure 12:
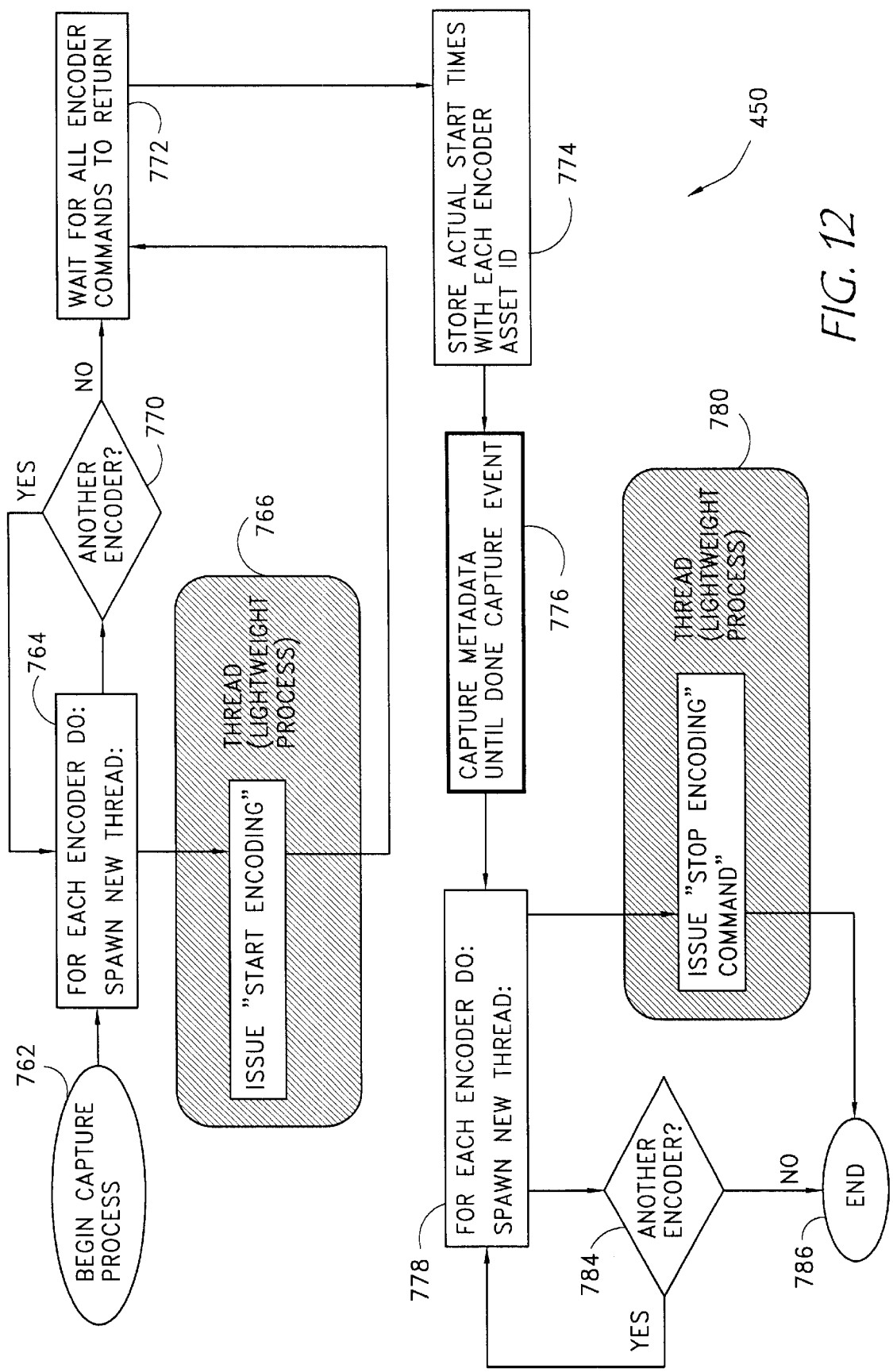
FIG. 12 is a flowchart of the video encoding (and metadata capture) synchronization process shown in FIG. 8.

FIG. 12 details an important aspect of the present invention, which is the control and synchronization of the video encoding process with the metadata capture process. This synchronization is necessary because time-code indices within the metadata elements should correspond to correct and known points within the digital video that results from the encoding process.

When video capture is initiated by the user, the video encoding process 450 starts at a begin step 762 and moves to step 764 wherein the Video Cataloger 110 (FIG. 1) first issues a Start Encoding command to each of N video encoders in parallel by spawning process threads 766 for each encoder present. A process thread or a lightweight process is well understood by computer technologists. This command/control is effected by the "Vidsync" daemon process 260 (FIG. 4) running on each encoder station. These Start commands are issued in parallel so that all the encoders begin encoding as close together in time as possible. However, their exact start times will not in general, be coincident. For this reason, the Vidsync process 260 returns the actual start times to the encoder flow control, and these times are stored by the Video Cataloger 110 with the video metadata in step 774 for later use. Next, the general process of capturing metadata occurs in step 776 until the process is stopped by the user. The details of the metadata capture process 776 are provided in FIG. 13. When capture is done, Stop Encoding commands are sent in parallel to each encoder (via Vidsync) by spawning process threads 780. It is of no consequence that the N encoders may stop encoding at slightly different times, as no metadata is associated with these time intervals.

13. Capture Metadata—flowchart

Figure 13:
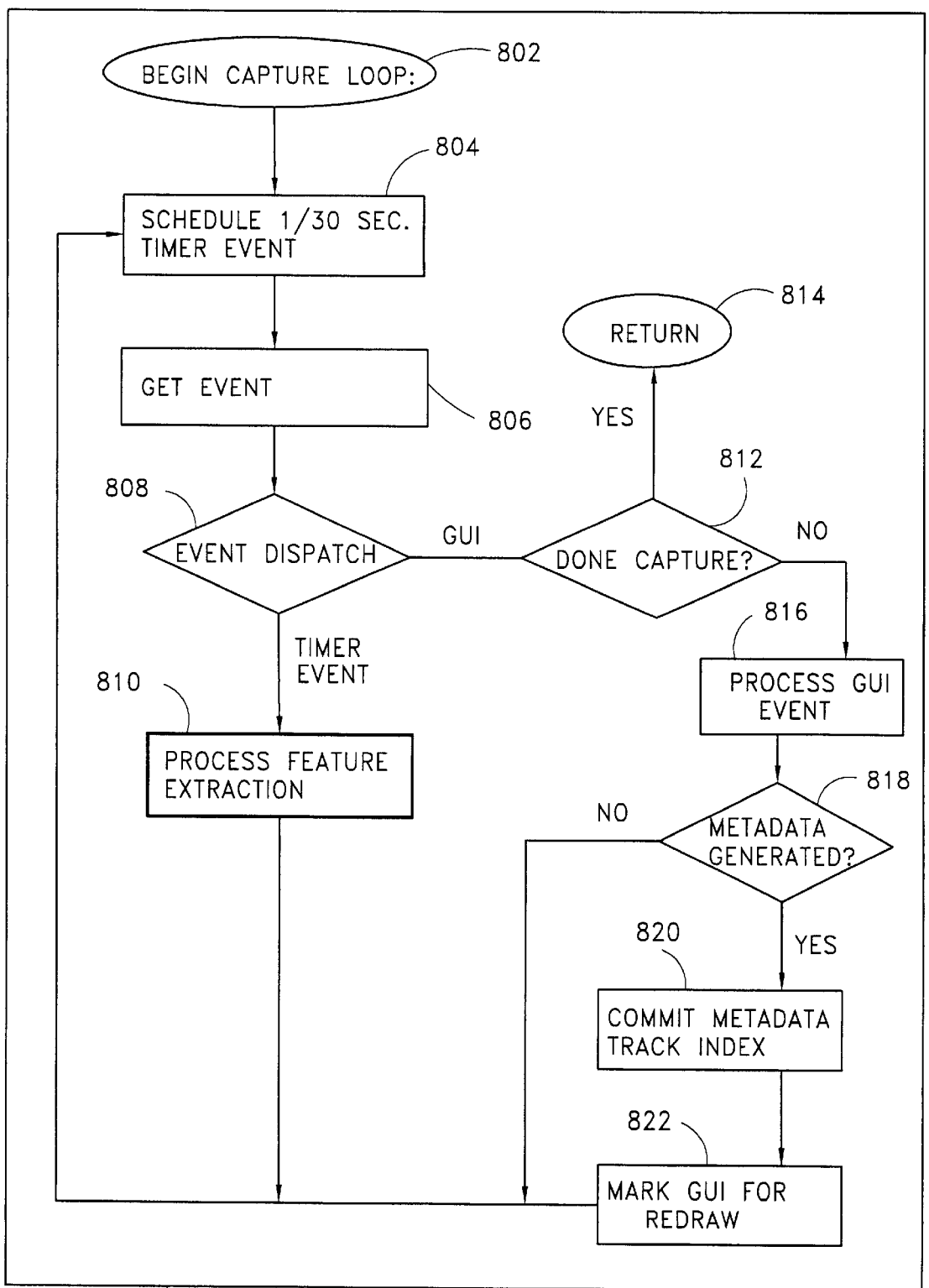
FIG. 13 is a flowchart of the capture metadata process shown in FIG. 12.

FIG. 13 details the metadata capture process 776 which is an important activity of the Video Engine 440 of FIG. 9. The metadata capture process 776 was first introduced in FIG. 12.

The capture process 776 begins with the scheduling of a system timer event in step 804 set to go off 1/30 of a second in the future. The control flow of the process 776 immediately proceeds to the Get Event step 806 where other system events (besides the timer event) may be processed. When an event occurs, control passes to the Event Dispatcher 808 which decides if the event is one of the two types of events: a normal GUI event, or the scheduled timer event.

For a GUI event, the event is first inspected in step 812 to determine if it is an End Capture event, in which case the capture process loop terminates. If not, processing proceeds to step 816 to handle the GUI event (such as keystroke, window resized, etc.). Some GUI events may generate metadata (if the user marked a video clip), which is determined in step 818. If metadata (a video clip) was in fact generated, that metadata is committed to the Metadata Track Index Manager 530 (FIG. 9) during step 820. This also necessitates a GUI redraw, so the affected parts of the GUI are marked for Redraw in step 822.

If the event dispatched in 808 is the timer event, this signifies that feature extraction of metadata from the video signals is to take place at a feature extraction process 810. The details of the feature extraction process 810 are provided in conjunction with FIG. 14. Once feature extraction is complete, control moves to step 804 where the next timer event is scheduled.

This flow of activity is tied to the event model of the operating system under which the software application is running. The flow that is shown is an event model that is typical of a Windows MFC-based application. Other operating system platforms, such as Unix, have event models that differ somewhat. The event model illustrates how the feature extraction process fits into an application event framework. Note that, in the depicted embodiment, the Get Event task 806 is a call out to Windows MFC, which processes Redraw Events by calling the Redraw method of the appropriate GUI elements directly (this process diagram does not "call" the Redraw methods directly). Note that it is acceptable if feature extraction takes more than 1/30 second.

14. Feature Extraction—Flowchart

Figure 14:
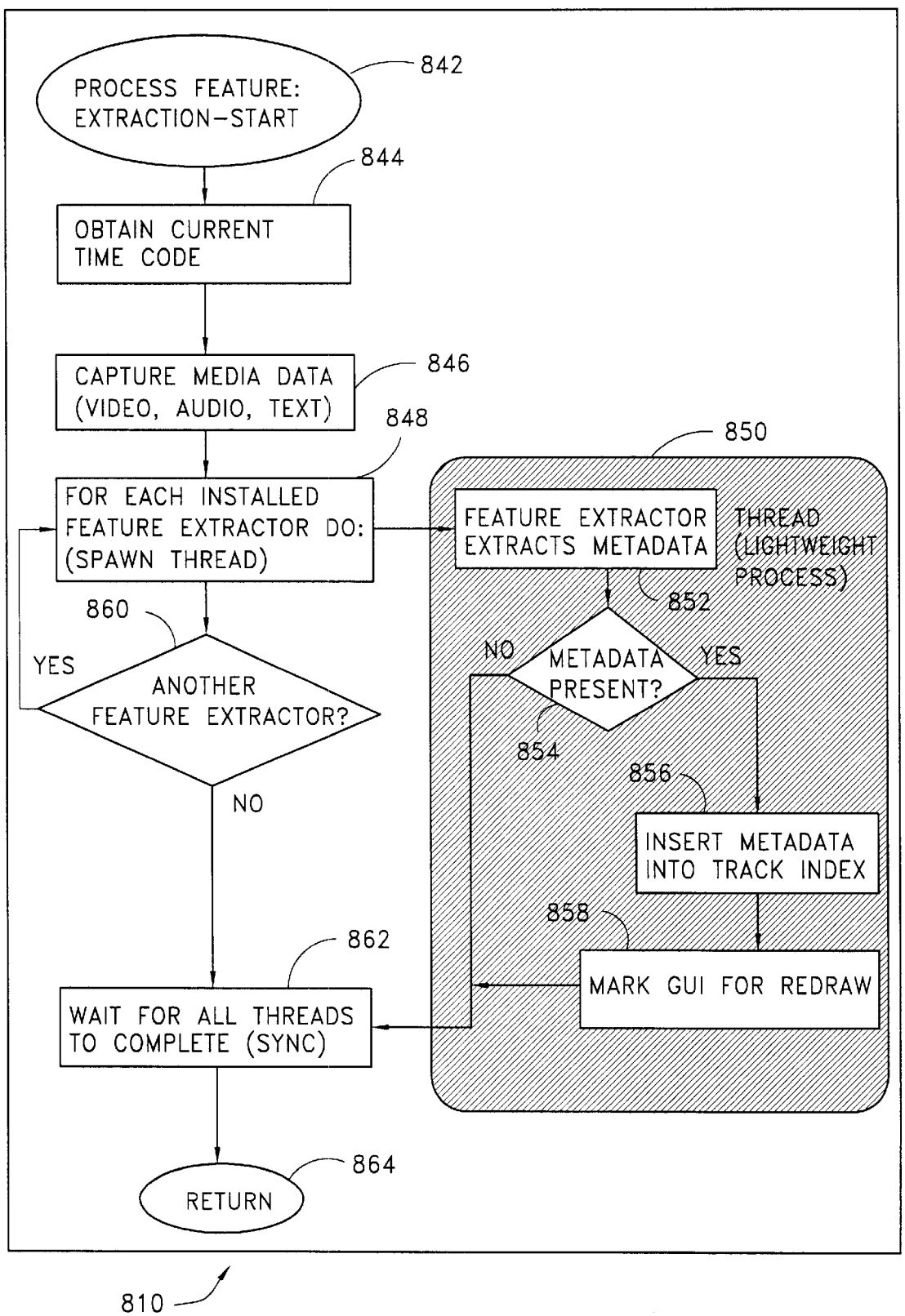
FIG. 14 is a flowchart of the feature extraction process shown in FIG. 13.

FIG. 14 details the feature extraction process 810, which is an important aspect of the present invention, relying on the innovative architecture of FIG. 9.

The feature extraction process 810 begins at a start step 842 and proceeds to step 844 where the current time code is obtained by module 502 of FIG. 9. This time code is used by all feature extractors to time-stamp the metadata they extract. Next, all digital media is captured in step 846 by modules 504, 506, and 508 of FIG. 9. This digital media is then passed on to the Feature Extractor Framework 510 (FIG. 9) for processing. The Feature Extractor Framework 510 spawns a process thread 850 for each feature extractor. Each feature extractor processes the digital media in step 852 in whatever way it desires, for example, extract a keyframe, classify the audio signal, etc. In certain cases, but not all, some metadata will be generated from this process. Step 854 determines if this is the case, and if so, the metadata is passed to the Metadata Track Index Manager 530 (FIG. 9) during step 856. Since metadata is usually displayed in real-time in the GUI, the GUI is marked for redraw in step 858. One particular exemplary feature: extractor for video keyframes is described in the pending U.S. patent application entitled "Key Frame Selection" filed on Jun. 6, 1997.

When all feature extractor threads complete, as determined at wait (synchronization) step 862, control is returned to the capture metadata process at end step 864.

15. HTML Output Filter—Architecture

Figure 15:
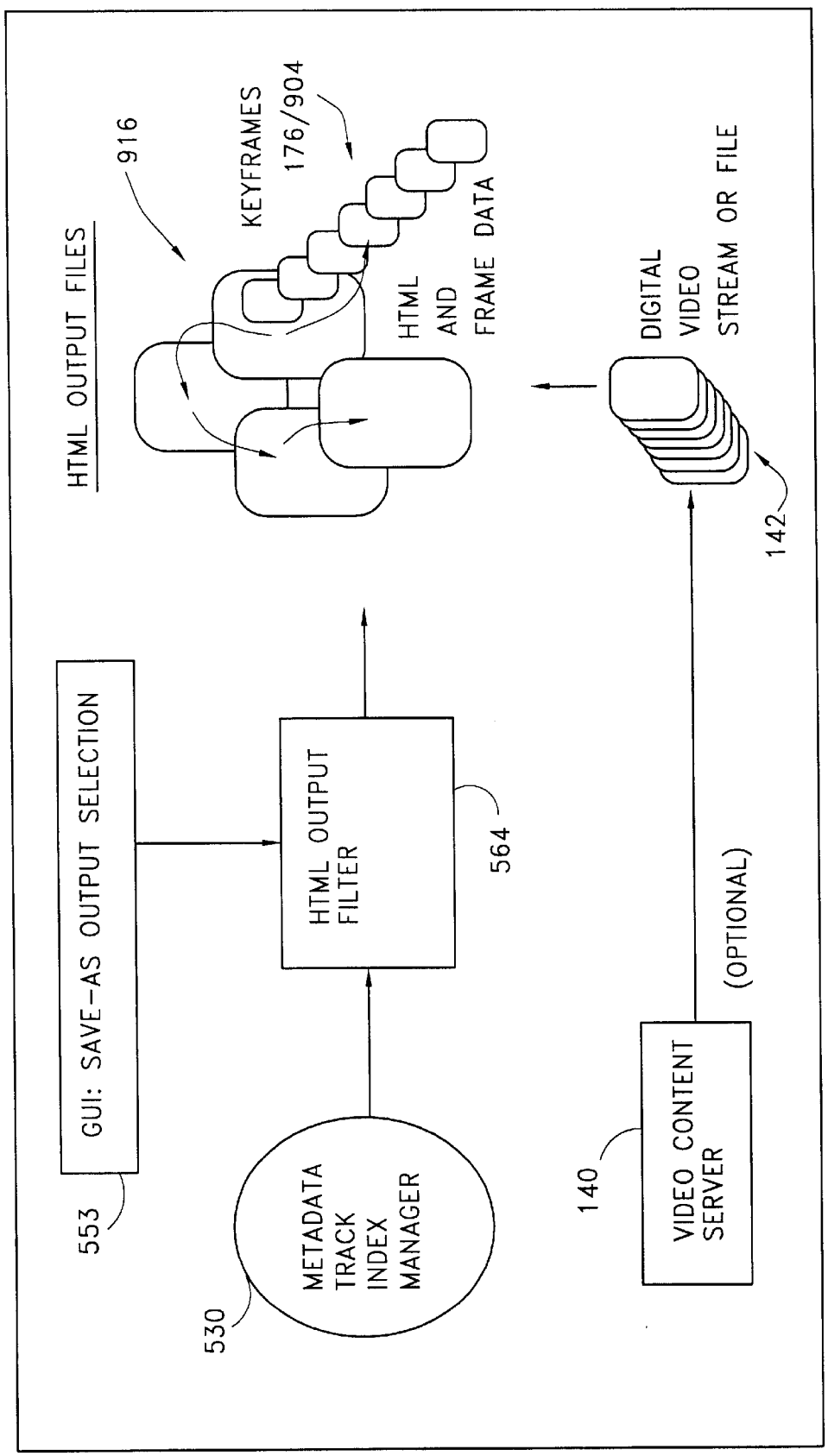
FIG. 15 is a block diagram of the architecture of the HTML output filter shown in FIG. 9 as used in the multimedia cataloger system shown in FIG. 1.
Figure 17:
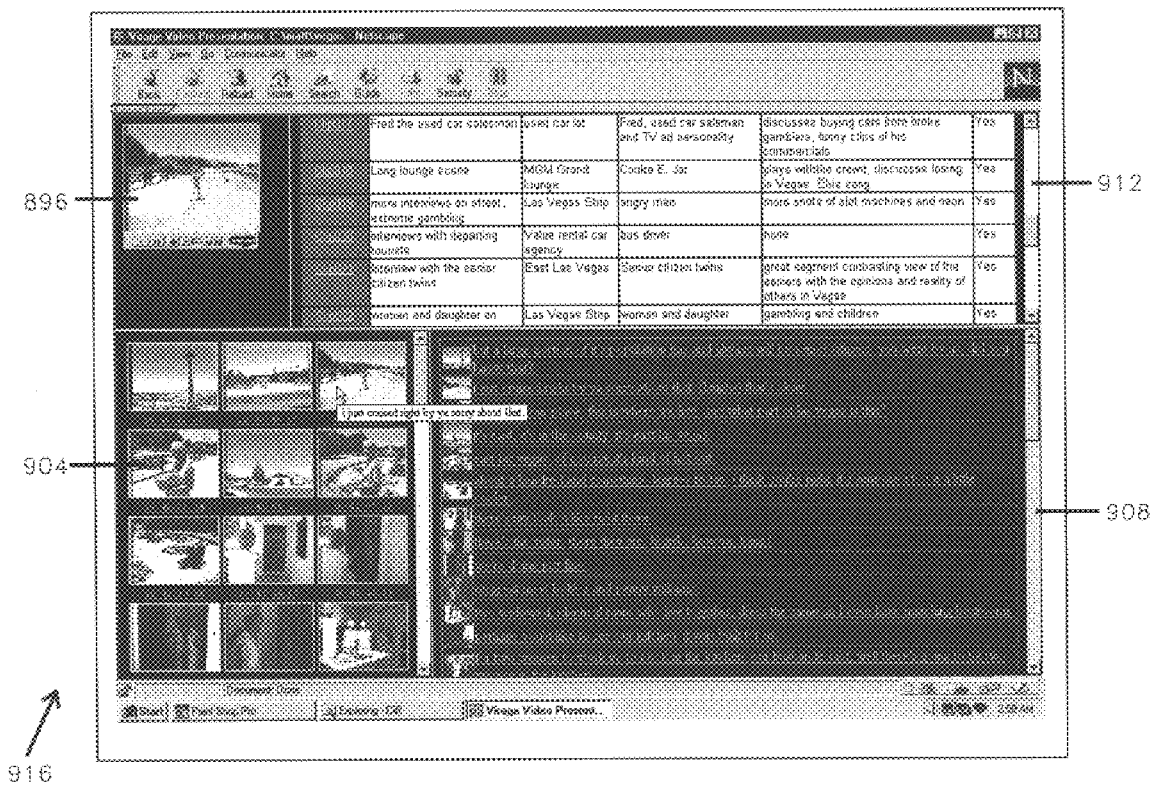
FIG. 17 is an exemplary screen display seen as an output of the HTML output filter process of FIG. 16 while using a client browser for the multimedia cataloger system shown in FIG. 1.
Figure 18:
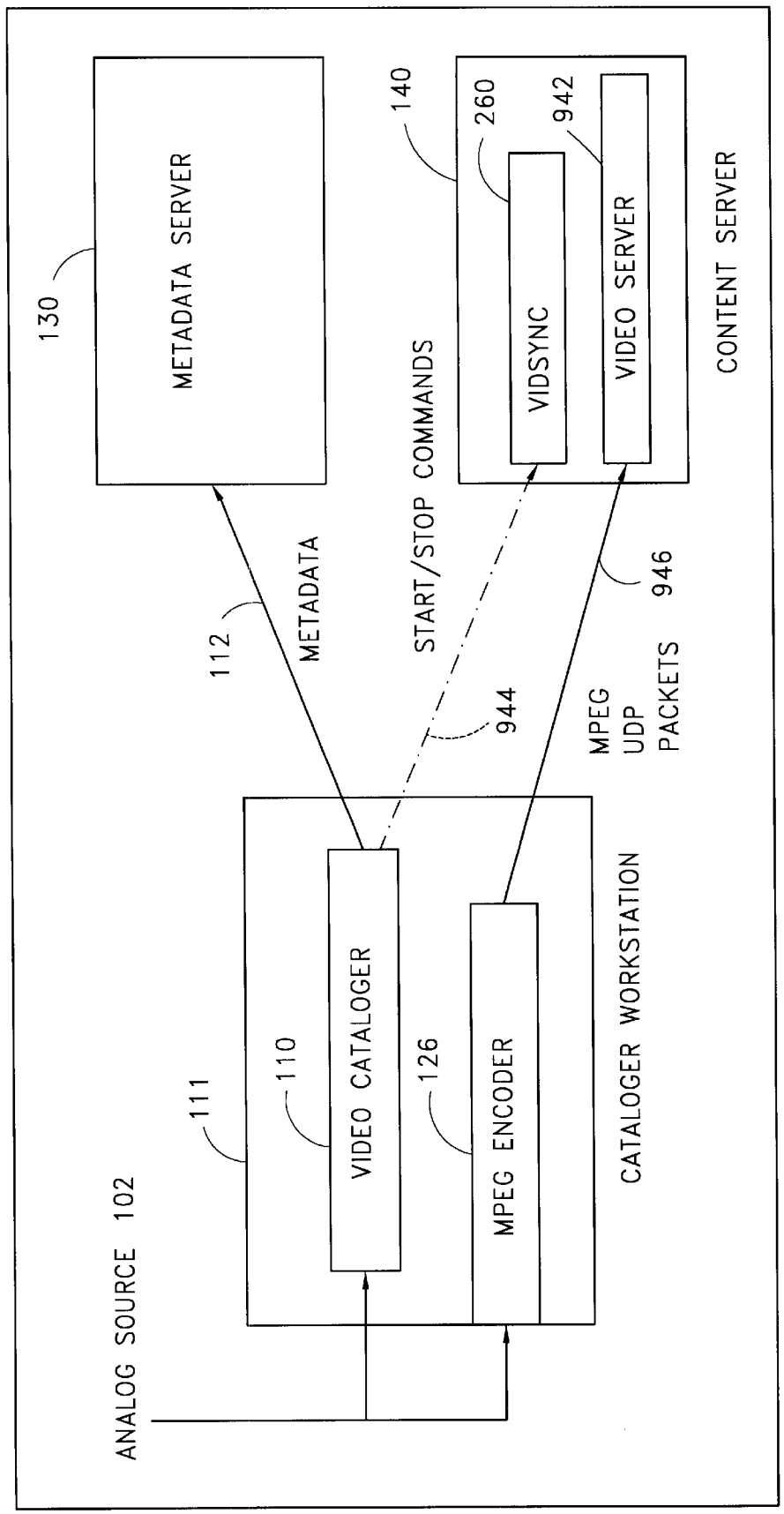
FIG. 18 is a block diagram of another embodiment of a multimedia cataloger system of the present invention.

The Output Filter Manager 560 (FIG. 8) may utilize a HTML output filter 564 in one embodiment. Referring to FIG. 15, elements of FIGS. 1, 2 and 9 are shown together as utilized in generating HTML output. The user may invoke a GUI command such as the "Save-As" command on the "File" menu 553, which in turn provides a list of output filter choices (HTML, Real Networks SMIL, XML, custom, etc.). When the HTML filter 564 is invoked, it accesses the metadata in the Metadata Track Index Manager 530 and processes it into HTML form in a browser window 916 (FIG. 17), which also involves keyframe images in a keyframe frame 176 (FIG. 2) or 904 (FIG. 17), and the digital video 142 (FIG. 1) or as seen in a video frame 896 (FIG. 17). For instance, hyperlinks may be formed from displayed keyframes to video sequences. The digital video 142 may or may not be served by a content server 140. For instance, it could be a simple file on the file system of the client computer or, say, a networked mass storage device visible to the computer.

Some key features of the Video Cataloger HTML output are:

a. The HTML files used to generate the display in the browser window 916 (FIG. 17) are completely stand-alone, internally linked HTML, such that no Web server is required. Exemplary HTML files are provided in the Appendix and are described in conjunction with FIG. 17 below.

b. It incorporates play-back of digital video 142 from a file or from a video server 140. That is, the digital video may be streamed directly to the browser, or it may simply be played from a local file on disk. The stand-alone aspect is strengthened when the digital video is a local file. This way, all of the content (HTML, keyframes, digital video) could be packaged up, compressed, and e-mailed to someone.

c. All metadata is cross-referenced/cross-linked based on time-codes.

d. Digital video is independent of the HTML representation—any digital video source can be linked into the playback frame.

16. HTML Output Filter—flowchart

Figure 16:
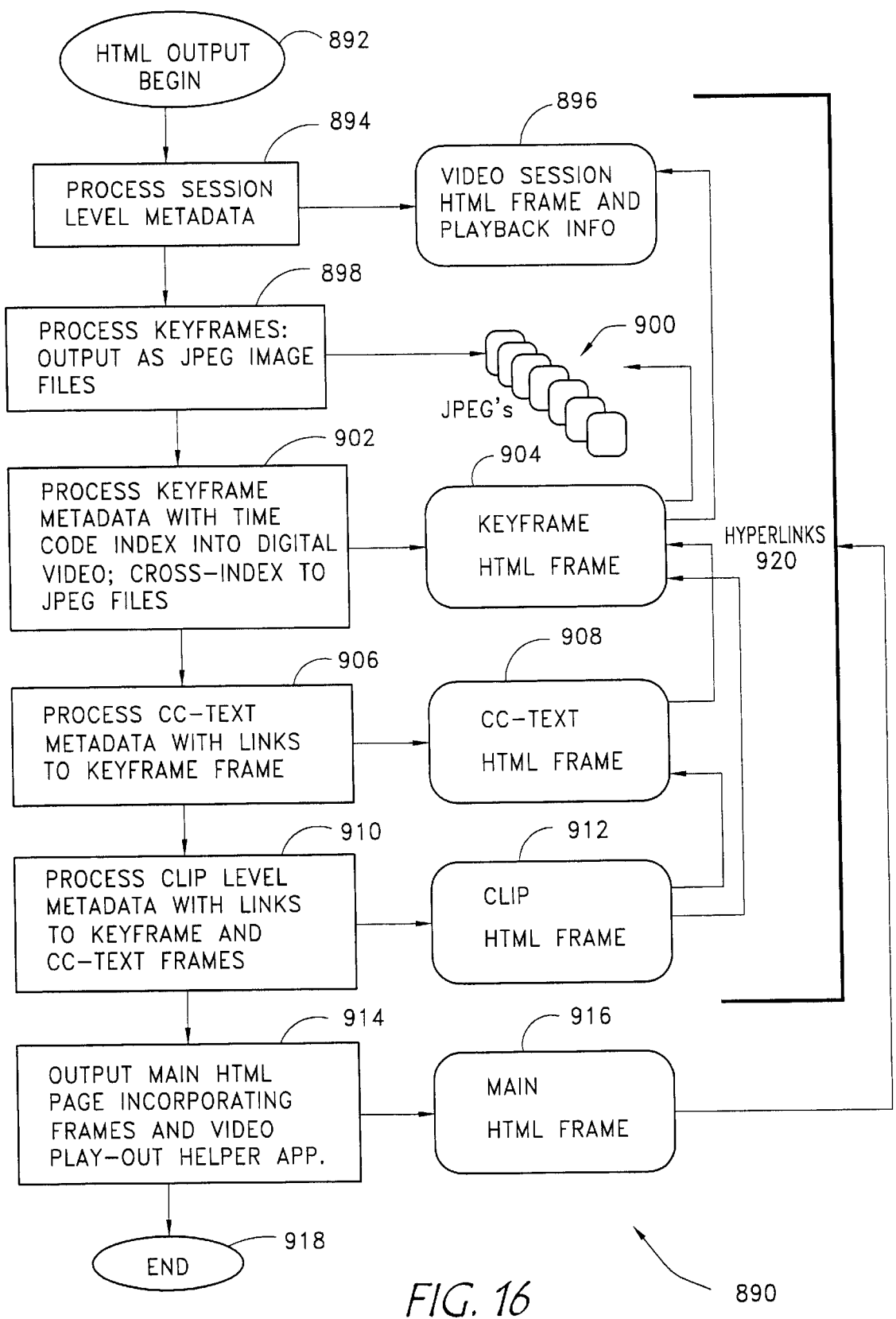
FIG. 16 is a flowchart of a HTML output filter process corresponding to the HTML output filter architecture shown in FIG. 15.

FIG. 16 details a HTML export process 890 from the Video Cataloger. This process 890 is performed by module 564 identified in FIGS. 9 and 15.

The output process 890 starts at a begin step 892 and proceeds to step 894 to process the session level metadata. This metadata is not time-based, but rather is descriptive of the entire logging session. The session level metadata corresponds to the information 404 generated by the Metadata Track Index Manager 402 shown in FIG. 7. The nature of the session level metadata is a schema which may be defined by the user, in addition to standard items such as the location where the video is taken. This information is encapsulated in an HTML frame 896 used to view this data on request, and is linked to the main HTML frame 916.

The next step is to process the keyframe track in step 898. Keyframe images, which are captured raster images, may be converted to JPEG images suitable for display in a web browser. JPEG is but one possible viewable format. For convenience, the JPEG image files 900 may be stored in a separate subdirectory of the Cataloger file system. At step 902, the keyframe track is then further processed by constructing an HTML keyframe frame containing the keyframe time code information used to invoke video playback in 896, and establishes hyperlinks directly to the corresponding JPEG images 900.

Next, the close caption text track is processed in step 906. The cc-text is output into an HTML frame, with hyperlinks created from time-codes into the keyframes of the HTML keyframe frame 904. This allows the user to click on cc-text elements, and invoke the corresponding set of related keyframes.

Video Clips are processed in step 910. The clips (defined by in- and out-times, and a user defined set of text labels) are output into an HTML Clip frame 912. The time codes are used to establish hyperlinks into the corresponding close caption text 908, and the corresponding keyframes in keyframe frame 904.

Finally, a main HTML page that incorporates the above frames is constructed in step 914. This HTML page embeds all the other frames for display and navigation. A video play-out helper application to decode and display video can be embedded in the web page frame. Examples of helper applications include RealPlayer (for RealVideo), Compcore SoftPEG (for MPEG) and Apple Quicktime.

Exemplary reference guides which could be useful to write the code to automatically generate HTML are HTML: The Definitive Guide, The second Edition (1997) Chuck Musciano and Bill Kennedy , O'Reilly & Associates, Inc. and "Treat Yourself Web Publishing with HTML", Laura LeMay, Sams Publishing, 1995, which are hereby incorporated by reference.

Note that this process flow is one example which incorporates a subset of all available metadata tracks. The output process 890 described above generated the exemplary screen shot in FIG. 17.

17. Example HTML Output—screen shot

Referring to FIGS. 16 and 17, a screen shot of the HTML output as seen at a client browser and as generated by the HTML output process 890 (FIG. 16) will be described. Element 896 corresponds to the video frame in the upper left portion of the screen display. Element 904 corresponds to the keyframe frame in the lower left portion of the screen display. Element 908 corresponds to the cc-text frame in the lower right portion of the screen display. Element 912 corresponds to the clip frame in the upper right portion of the screen display. Element 916 corresponds to the whole browser window. As with most browsers, including Microsoft Explorer and Netscape Navigator, if the displayable page is larger than the physical display, the browser will cause the page to be scrolled. Video data is retrieved by sending a time code to the embedded player application. The player application then retrieves the video, seeks to the requested time code (in-time), and begins playback. The user can interrupt the playback using standard VCR type controls on the player.

The HTML code for an exemplary screen display is provided in the Appendix. Sheets A, B, C, D, E, G, H1, N and P are hereby incorporated by reference in their entirety and can be found in the USPTO file for Application No. 09/134,498. Sheet A of the Appendix lists the directory names (clip and icons) and file names at a top level. Sheet B lists the files in the clip directory, while sheets C, D and E list the files in the icons directory. Sheet F lists the HTML code for the top level index.html file which provides the framework for the display shown in the browser window 916 (FIG. 17). Sheet G lists the contents of the topr.html file (as would be seen in the clip frame 912 (FIG. 17)). Sheet H lists the contents of the video_label.html file. Sheet I lists the contents of the video_mbase.html file. Sheet J lists the contents of the video_netshow.html file. Sheet K lists the contents of the video_noproxy.html file. Sheet L lists the contents of the video_ovs.html file. Sheet M lists the contents of the video_real.html file. Sheets J, K, L, and M may be used to provide the proxy video to allow different video formats to be displayed in the video frame 896 (FIG. 17). Sheet N lists the contents, including a set of keyframes and corresponding timecodes (as would be seen in the keyframe frame 904 (FIG. 17)), of the 000l.html file in the clips directory. Sheet P lists the contents, including a set of icons in a closed-caption text frame (as would be seen in the cc-text frame 908 (FIG. 17)), of the 000r.html file in the clips directory. The remaining sheets in the Appendix are alternate instances of the contents shown in exemplary sheets N and P. Of course, other programming languages besides HTML code could be used to implement hyperlinked output conversion.

18. Alternative System

An alternate embodiment 940 of the video encoding process, which involves a video server 942, is shown in FIG.

18. In this scenario, digital video is encoded in a MPEG stream on the Cataloger workstation 111. The data stream is broadcast as a set of UDPs (Universal Datagram Packets) 946 on a specific port number (configurable). UDPs is a standard which is a member of the IP family of protocols. When cataloging begins, the Video Cataloger 110 sends a START command 944 to a Vidsync process 260 which is running on the content server 140 where the video server software process 942 is running. Vidsync 260 in turn tells the video server 942 to "start listening" for UDP packets 946 on the specific port number. The video server 942 then begins "catching" the UDP packets 946, and converting the MPEG data into a digital video asset on that server 942. As always, metadata 112 is sent from the Video Cataloger 110 to the metadata server 130 in parallel to this encoding process. When a STOP command 944' is issued, Vidsync 260 signals the video server 942 to stop listening for the UDP packets 946.

In point of fact, the allocations of support hardware, computer workstations and software processes are only described here as but one example. Many other functional partitions can be defined to implement the present invention.

While the above detailed description has shown, described, and pointed out the fundamental novel features of the invention as applied to various embodiments, it will be understood that various omissions and substitutions and changes in the form and details of the system illustrated may be made by those skilled in the art, without departing from the concepts of the invention.

---

Appendix F index.html

```
<HTML>
<HEAD>
<TITLE>
Virage Video Presentation: hongkong_5minute
</TITLE>
<SCRIPT>
// edit this variable to point to proxy URL
var urlroot="pnm://realserver/content/hongkong.rm";
var preroll=0;
var proxy_type="real"
var lastimg;
function DisplayFrame(offset)
{
 var a = top.frames[1].botl.location.href.split('#');
 top.frames[1].botl.location.href = a[0] + "#" + offset;
 var img=eval("top.frames[1].botl.document.i" + offset);
 if (lastimg && (lastimg != img)) lastimg.src=". . ./icons/spacer.gif";
 if (img) img.src=". . ./icons/red.gif";
 lastimg=img;
}
function PlayVideo(offset)
{
 var d=top.frames[0].topl.document;
 if proxy_type == "real")
 {
 if (navigator.appName == "Netscape")
  {
   d.VideoImageWindow.SetSource(top.urlroot + "?start=" + "\"" +
Math.round(offset/1000 + top.preroll) + "\"");
   d.VideoImageWindow.DoPlayPause();
  }
  else
  {
   d.RAOCX.Source= top.urlroot + "?start=" + "\"" + Math.round
(offset/1000 + top.preroll) + top.preroll) + "\"");
   d.RAOCX.DoPlayPause();
  }
}
```

---

Appendix F
-continued

```
if proxy_type =32 "netshow")
{
top.frames[0].topl.NSPlay.Filename = top.urlroot;
top.frames[0].topl.NSPlay.SelectionStart = Math.round(offset/1000 +
top.preroll);
top.frames[0].topl.NSPlay.Play();
}
if (proxy_type == "mbase")
{
var start = (offset* 1000 + preroll* 1000000);
d.location.href = top.urlroot + "?StartPosition=" + start + "&AutoStart=
TRUE";
}
if (proxy_type = "ovs")
{
 if(navigator.userAgent.toLowerCase().indexOf("msie") == −1)
{ // netscape browser
   top.frames[0].topl.document.video.load(top.urlroot);
   top.frames[0].topl.document.video.play(offset+top.preroll * 1000,
offset+10000000);
 } else { // msie browser
   top.frames[0].topl.document.video.Load(top.urlroot);
   top.frames[0].topl.document.video.Play();
   top.frames[0].topl.document.video.SetPos(1,offset+top.preroll* 1000);
 }
}
if (proxy_type == "noproxy")
{
 alert("No proxy available");
 }
}
<SCRIPT>
<FRAMESET ROWS=240,* BORDER=2>
<FRAME NAME=top SRC=top.html SCROLLING=AUTO>
<FRAME NAME=bot SRC=clips/000.html SCROLLING=AUTO>
</FRAMESET>
</HEAD>
</HTML>
```

---

Appendix H video_label.html

```
<HTML>
<HEAD>
<SCRIPT>
function select_proxy() {
 for(var i=0; i<document.f.proxy_type.length; i++) {
  if (document.f.proxy_type.options[i].value == window.opener.top.
proxy_type) {
    document.f.proxy_type.options[i].selected =1;
  }
 }
}
function write_url_input() { document.write("<INPUT SIZE=40
NAME=URL VALUE=\""+ opener.top.urlroot + "\">"); }
function write_preroll_input() {document.write("<INPUT SIZE=5
NAME=PREROLL VALUE=\"" + opener.top.preroll + "\">"); }
function setvalues()
{
 window.opener.top.urlroot = document.f.URL.value;
 window.opener.top.preroll = parseInt(document.f.PREROLL.value);
                 window.opener.top.proxy_type    =
document.f.proxy_type.options[document.fproxy_type.selected
Index].value;
 window.opener.top.frames[0].topl.location = "video_" + window.
opener.top.proxy_type + ".html"
 if (isNaN(window.opener.top.preroll)) window.opener.top.preroll=0;
 window.close();
}
```

Appendix H

```
</SCRIPT>
</HEAD>
<BODY BGCOLOR=000066 onLoad=select_proxy()>
<CENTER>
<FORM NAME=f>
<TABLE BORDER=1 BGCOLOR=FFFFFF>
  <TR>
   <TH WIDTH=20% BGCOLOR=6666AA><FONT FACE="Arial"
COLOR=FFFFFF SIZE=-1 >URL</FONT></TH><TD><SCRIPT>
write_url_input();</SCRIPT></TD>
  </TR>
  <TR>
       <TH BGCOLOR=6666AA><FONT FACE="Arial"
COLOR=FFFFFF SIZE=-1 >Preroll</FONT></TH><TD>
<SCRIPT>write_preroll_input();</SCRIPT></TD>
  </TR>
  <TR>
     <TH BGCOLOR=6666AA><FONT FACE="Arial" COLOR=
FFFFFF SIZE=-1>Proxy Type</FONT></TH>
    <TD>
   <SELECT NAME=proxy_type>
   <OPTION VALUE="real">RealNetworks RealVideo
   <OPTION VALUE="netshow">Microsoft Netshow
   <OPTION VALUE="mbase">SGI Mediabase
   <OPTION VALUE="ovs">Oracle Video Server 3.0
   <OPTION VALUE="noproxy">No Proxy
    </SELECT>
    </TD>
   </TABLE>
<INPUT VALUE="Modify Values" TYPE=SUBMIT onClick=
"javascript:setvalues()">
<P>
<TABLE WIDTH=100% BORDER=1 BGCOLOR=FFFFFF>
<TR>
<TH   BGCOLOR=6666AA><FONT SIZE=-1   COLOR=FFFFFF
FACE="Arial">Slug</FONT></TH>
<TD><FONT SIZE=-1 COLOR=000000 FACE="Arial">video2
</FONT></TD>
</TR>
<TR>
<TH   BGCOLOR=6666AA><FONT SIZE=-1   COLOR=FFFFFF
FACE="Arial">Description</FONT></TH>
<TD><FONT SIZE=-1 COLOR=000000 FACE="Arial">Hong Kong
</FONT></TD>
</TR>
<TR>
<TH   BGCOLOR=6666AA><FONT SIZE=-1   COLOR=FFFFFF
FACE="Arial">Tape ID</FONT></TH>
<TD><FONT SIZE=-1 COLOR=000000 FACE="Arial">1234</FONT>
</TD>
</TR>
<TR>
<TH   BGCOLOR=6666AA><FONT SIZE=-1   COLOR=FFFFFF
FACE="Arial">Log Date<FONT><TH>
<TD><FONT SIZE=-1   COLOR=000000   FACE="Arial">06-18-1998
</FONT></TD>
</TR>
<TR>
<TH   BGCOLOR=6666AA><FONT SIZE=-1   COLOR=FFFFFF
FACE="Arial">Logger</FONT></TH>
<TD><FONT SIZE=-1 COLOR=000000 FACE="Arial">279</FONT>
</TD>
</TABLE>
</CENTER>
</FORM>
</BODY>
</HTML>
```

Appendix I video_mbase.html

```
<HTML>
<HEAD>
<SCRIPT>
function open_video_label()
{ window.open("video_label.html","videolabel","width=500,height_400,
scrollbars=yes"); }
</SCRIPT>
</HEAD>
<BODY BGCOLOR=000000>
<CENTER>
<IMG BORDER=0 SRC=icons/colorbars.gif WIDTH=160 HEIGHT=120>
<BR>
<BR><FONT SIZE=-1   FACE="Arial"><A HREF="javascript:
open_video_label()">Video Label</FONT></A>
</CENTER>
</BODY>
</HTML>
```

Appendix J video_netshow.html

```
<HTML>
<HEAD>
<SCRIPT>
function open_video_label()
{ window.open("video_label.html","videolabel","width=500,height=400,
scrollbars=yes"); }
</SCRIPT>
</HEAD>
<BODY BGCOLOR=000000>
<CENTER>
<SCRIPT>
if (navigator.userAgent.toLowerCase().indexOf("msie") == -1) {
 alert("Netshow is supported only in MSIE 4.x browsers/reverting to no
  proxy . . . ") this.location ="video_noproxy.html";
}
</SCRIPT>
<BR>
<OBJECT ID="NSPlay" WIDTH=160 HEIGHT=160 CLASSID=
"CLSID:22d6312-b0f6-11d0-94ab-0080c74c7e95"
CODEBASE="http://www.microsoft.com/NetShow/downlaod/en/nsasfinf.
cab#Version=2,0,0,912">
<PARAM NAME="AutoStart" VALUE="0">
<PARAM NAME="MovieWindowWidth" VALUE=" 160">
<PARAM NAME="MovieWindowHeight" VALUE=" 120">
<PARAM NAME="ShowDisplay" VALUE="0">
<PARAM NAME="ShowControls" VALUE="1">
<PARAM NAME="ShowPositionControls" VALUE="0">
<PARAM NAME="ShowSelectionControls" VALUE="0">
<PARAM NAME="EnablePositionControls" VALUE="0">
<PARAM NAME="EnableSelectionControls" VALUE="0">
<PARAM NAME="ShowTracker" VALUE="1">
<PARAM NAME="EnableTracker" VALUE="1">
<PARAM NAME="BorderStyle" VALUE="2">
<PARAM NAME="DisplayMode" VALUE="0">
<PARAM NAME="Appearance" VALUE="0">
<PARAM NAME="DisplayForeColor" VALUE="65535">
<PARAM NAME="DisplayBackColor" VALUE="65535">
</OBJECT>
<BR><FONT SIZE=-1 FACE="Arial"><A HREF="javascript:
open_video_label()">Video Label</FONT></A>
</CENTER>
</BODY>
</HTML>
```

Appendix K video_noproxy.html

```
<HTML>
<HEAD>
<SCRIPT>
function open_video_label()
{ window.open("video_label.html","videolabel", "width=500,
height=400,scrollbars=yes"); }
</SCRIPT>
</HEAD>
<BODY BGCOLOR=000000>
<CENTER>
<IMG BORDER=0 SRC=icons/colorbars.gif WIDTH=160 HEIGHT=120>
<BR>
<BR><FONT SIZE=-1 FACE="Arial"><A HREF="javascript:
open_video_label()">Video Label</FONT></A>
</CENTER>
</BODY>
</HTML>
```

Appendix L video_ovs.html

```
<HTML>
<HEAD>
<SCRIPT>
function open_video_label()
{ window.open("video label.html","videolabel" ,"width=500,height=400,
scrollbars=yes"); }
</SCRIPT>
</HEAD>
<BODY BGCOLOR=000000>
<CENTER>
<OBJECT ID="video"
  CLASSID="CLSID:547A04EF-4F00-11D1-9559-0020AFF4F597"
  WIDTH=160
  HEIGHT=120>
<PARAM NAME="ShowControls" VALUE="0">
<PARAM NAME="BorderStyle" VALUE="1">
<EMBED
  TYPE="application/oracle-video"
  NAME="video"
  WIDTH=160
  HEIGHT=120
  CONTROLS=FALSE
  AUTOSTART=FALSE>
</OBJECT>
<BR><FONT SIZE=-1 FACE="Arial"><A HREF="javascript:
open_video_label()">Video Label</FONT></A>
</CENTER>
</BODY>
</HTML>
```

Appendix M video_real.html

```
<HTML>
<HEAD>
<SCRIPT>
function open_video_label()
{ window.open("video_label.html","videolabel","width=500,height=400,
scrollbars=yes"); }
</SCRIPT>
</HEAD>
<BODY BGCOLOR=000000>
<CENTER>
```

Appendix M -continued

```
<OBJECT ID=RAOCX
  CLASSID="clsid:CFCDAA03-8BE4-11cf-B84B-0020AFBBCCFA"
  WIDTH=160
  HEIGHT=120>
<PARAM NAME="SRC"   VALUE="empty.rpm">
<PARAM NAME="CONTROLS" VALUE="ImageWindow">
<PARAM NAME=" CONSOLE" VALUE="clip 1">
<EMBED
  SRC=empty.rpm
  CONTROLS=ImageWindow
  NAME=VideoImageWindow
  AUTOSTART=FALSE
  CONSOLE=clip 1
  WIDTH=160
  HEIGHT=120
  BORDER=0><BR>
</OBJECT><BR>
<EMBED
  SRC=empty.rpm
  WIDTH=160
  HEIGHT=30
  CONTROLS=ControlPanel
  CONSOLE=clip 1
  AUTOSTART=FALSE
  BORDER=0>
<BR><FONT SIZE=-1 FACE="Arial"><A HREF="javascript:
open_video_label()">Video Label</FONT></A>
</CENTER>
</BODY>
</HTML>
```

What is claimed is:

1. An extensible video engine receiving video information, comprising:
   a video capture service to store the video information;
   a plurality of video feature extractors to produce metadata tracks from the video information, wherein each metadata track indexes the stored video information; and
   a feature extractor registration interface to register the video feature extractors, wherein a new video feature extractor with a new metadata track can be registered with the engine.

2. The video engine of claim 1, wherein the video information includes at least one of: video, audio, time codes and text.

3. The video engine of claim 1, wherein the plurality of feature extractors produces metadata tracks including at least one of: keyframe, close caption text, audio analysis, speech-to-text and speaker identification.

4. The video engine of claim 1, additionally comprising an output filter manager to store the metadata track in an output format.

5. The video engine of claim 4, wherein the output format can be one of: VDF, HTML, XML and SMIL.

6. The video engine of claim 4, additionally comprising an output filter registration interface to register a new output filter to convert the metadata to a new output format.

7. The video engine of claim 1, additionally comprising an event manager to handle any one of a plurality of events, and an event registration interface to register a new event and an associated event handler with the event manager.

8. The video engine of claim 1, additionally comprising a metadata track index manager to selectively apply the feature extractors to the video information, and a metadata track registration interface to register a new metadata track with the metadata track index manager.

9. The video engine of claim 1, wherein the video information is received from a live satellite feed.

10. The video engine of claim 1, wherein the video information is received from a digital source.

11. A method of extending a video engine receiving video information, comprising:

providing a plurality of built-in metadata tracks;

providing a plurality of built-in video feature extractor, each built-in feature extractor being associated with one of the built-in metadata tracks; and registering a new metadata track and an associated new feature extractor with the video engine.

12. The method of claim 11 wherein the built-in metadata tracks includes at least one of: keyframe, close caption text, audio analysis, speech-to-text and speaker identification.

13. The method of claim 11, additionally comprising providing a plurality of built-in output filters to convert the metadata tracks into an output format, and registering a new output filter to convert the metadata tracks into a new output format with the video engine.

14. The method of claim 11, additionally comprising registering an event and an associated event handler with the video engine.

15. The method of claim 11, additionally comprising capturing user information to generate a clip metadata track based on the video information.

16. The method of claim 11, additionally comprising indexing each metadata track to the received video information.

17. The method of claim 11, additionally comprising displaying selected ones of the metadata tracks.

18. The method of claim 11, additionally comprising capturing the video information.

19. The method of claim 18, wherein the video information includes video, audio, time codes and text.

20. The method of claim 18, wherein the capturing is from a digital source.

* * * * *

UNITED STATES PATENT AND TRADEMARK OFFICE
CERTIFICATE OF CORRECTION

| | | |
|---|---|---|
| PATENT NO. | : 6,463,444 B1 | Page 1 of 1 |
| APPLICATION NO. | : 09/134498 | |
| DATED | : October 8, 2002 | |
| INVENTOR(S) | : Ramesh Jain et al. | |

It is certified that error appears in the above-identified patent and that said Letters Patent is hereby corrected as shown below:

At Column 1, approximately Line 20, after the section entitled "RELATED APPLICATIONS", and before the section entitled "BACKGROUND OF THE INVENTION", please insert a new section entitled -- GOVERNMENTAL RIGHTS --.

After the added section header for GOVERNMENTAL RIGHTS, please insert -- This invention may have been made with Government support under Contract No. DAAH01-97-C-R190, awarded by the U.S. Army Aviation and Missile Command and Contract No. DAAH01-96-C-R121, awarded by the U.S. Army Missile Command. The Government may have certain rights in this invention. --.

Signed and Sealed this

Third Day of August, 2010

David J. Kappos
*Director of the United States Patent and Trademark Office*